(12) United States Patent
Muratani et al.

(10) Patent No.: US 11,865,637 B2
(45) Date of Patent: Jan. 9, 2024

(54) LASER MACHINING APPARATUS AND LASER MACHINING METHOD

(71) Applicants: MURATANI MACHINE INC., Kanazawa (JP); ISHIKAWA PREFECTURE, Kanazawa (JP); OSAKA UNIVERSITY, Suita (JP)

(72) Inventors: Sotohiro Muratani, Kanazawa (JP); Masahiro Tsukamoto, Suita (JP); Yoshinori Funada, Kanazawa (JP); Yorihiro Yamashita, Kanazawa (JP)

(73) Assignees: MURATANI MACHINE INC., Kanazawa (JP); ISHIKAWA PREFECTURE, Kanazawa (JP); OSAKA UNIVERSITY, Suita (JP)

( * ) Notice: Subject to any disclaimer, the term of this patent is extended or adjusted under 35 U.S.C. 154(b) by 802 days.

(21) Appl. No.: 16/089,878

(22) PCT Filed: Mar. 30, 2017

(86) PCT No.: PCT/JP2017/013305
§ 371 (c)(1),
(2) Date: Sep. 28, 2018

(87) PCT Pub. No.: WO2017/170890
PCT Pub. Date: Oct. 5, 2017

(65) Prior Publication Data
US 2019/0111517 A1 Apr. 18, 2019

(30) Foreign Application Priority Data
Mar. 31, 2016 (JP) ................................ 2016-071462

(51) Int. Cl.
*B23K 26/064* (2014.01)
*B23K 26/21* (2014.01)
(Continued)

(52) U.S. Cl.
CPC ............ *B23K 26/064* (2015.10); *B23K 26/14* (2013.01); *B23K 26/146* (2015.10); *B23K 26/21* (2015.10); *B23K 26/34* (2013.01); *B23K 26/342* (2015.10)

(58) Field of Classification Search
CPC .. B23K 26/146; B23K 26/342; B23K 26/064; B23K 26/21
See application file for complete search history.

(56) References Cited

U.S. PATENT DOCUMENTS

| 7,502,537 | B2 * | 3/2009 | Kurahashi | ............ B23K 1/0056 |
| | | | | 385/115 |
| 2003/0116542 | A1 * | 6/2003 | McGregor | .............. B23P 15/04 |
| | | | | 219/121.64 |

(Continued)

FOREIGN PATENT DOCUMENTS

| JP | H02-147184 A | 6/1990 |
| JP | H09-216083 A | 8/1997 |

(Continued)

OTHER PUBLICATIONS

PCT International Search Report of PCT/JP2017/013305 dated May 30, 2017.

*Primary Examiner* — Erin McGrath
(74) *Attorney, Agent, or Firm* — Manabu Kanesaka

(57) ABSTRACT

A laser machining device includes a plurality of optical fibers and a collimator lens arranged in parallel along a supply nozzle for supplying a molten material, and a laser beam projected from the optical fiber is applied onto an axis between a tip of the supply nozzle and a build-up welding spot.

9 Claims, 38 Drawing Sheets

(51) Int. Cl.
*B23K 26/14* (2014.01)
*B23K 26/34* (2014.01)
*B23K 26/146* (2014.01)
*B23K 26/342* (2014.01)

(56) References Cited

U.S. PATENT DOCUMENTS

2014/0076870 A1* 3/2014 Hirano ............... B23K 26/0648
 219/121.75
2015/0040364 A1* 2/2015 Ogasahara ................ B23P 6/04
 29/402.07

FOREIGN PATENT DOCUMENTS

| | | | |
|---|---|---|---|
| JP | 2000-317667 A | | 11/2000 |
| JP | 2003-251480 A | | 9/2003 |
| JP | 2003251480 A | * | 9/2003 |
| JP | 2004-291031 A | | 10/2004 |
| JP | 2004-322183 A | | 11/2004 |
| JP | 2010-042424 A | | 2/2010 |
| JP | 2013-139039 A | | 7/2013 |
| JP | 2015-178130 A | | 10/2015 |

* cited by examiner

Nomal Nozzle

Double Nozzle

Nomal Nozzle

Double Nozzle

LASER MACHINING APPARATUS AND LASER MACHINING METHOD

CROSS-REFERENCE TO RELATED APPLICATIONS

The present application is National Phase of International Application No. PCT/JP2017/013305 filed on Mar. 30, 2017, and claims priority from Japanese Application No. 2016-071462 filed on Mar. 31, 2016.

TECHNICAL FIELD

The present invention relates to a laser machining apparatus which projects a laser beam from an optical fiber, and a laser machining method.

BACKGROUND ART

A laser machining apparatus which irradiates a laser beam from an optical fiber and a laser machining method have been put into practice in laser welding, laser soldering and the like, and build-up welding and thermal spraying make a film from a material for improving heat resistance/corrosion resistance and abrasion resistance of the material itself. In a laser-powder build-up apparatus, for example, a molten material as a laser raw material is irradiated with a laser beam so as to be heated and molted, and then used to make a film for coating a base material surface. Therefore, coating with a rigid film or a film which is hardly corroded can prevent abrasion or rusting of a product, for example.

Conventionally, in the laser-powder build-up apparatus, the laser beam is perpendicularly applied to the base material surface, and the molten material is supplied to an optical axis of the applied laser beam from a supply nozzle disposed on an outer periphery so that the molten material is molten and the build-up machining is carried out (Patent Literature 1: FIGS. 6 and 7, Patent Literature 4 FIG. 7).

CITATION LIST

Patent Literature

Patent Literature 1: Japanese Patent Laid-Open No. 02-147184
Patent Literature 2: Japanese Patent Laid-Open No. 09-216083
Patent Literature 3: Japanese Patent Laid-Open No. 2000-317667
Patent Literature 4: Japanese Patent Laid-Open No. 2003-251480
Patent Literature 5: Japanese Patent Laid-Open No. 2004-322183
Patent Literature 6: Japanese Patent Laid-Open No. 2015-178130
Patent Literature 7: Japanese Patent Laid-Open No. 2013-139039

DISCLOSURE OF INVENTION

Problems to be Solved by the Invention

At present, a demand for products having various shapes such as three-dimensional shapes is increased due to diversification of consumers' needs in industrial products, and necessity of making a film on a base material having a complicated shape have emerged. In making a film on a base material having a complicated shape such as a three-dimensional shape, for example, a shape of a welding position is also complicated and thus, a technique of build-up welding by multi-axis rotation and multi-axis movement of a laser machining head portion of a laser machining apparatus has been introduced. However, it is extremely difficult to accurately supply the molten material onto an optical axis of the laser beam with the conventional machining method in which the supply nozzle is disposed on an outer periphery of the laser beam (if an irradiation position of the laser beam is shifted from a center of a lens, the beam transmitted through the lens travels with inclination with respect to the optical axis and thus, X-axis adjustment or YZ adjustment for aligning the center of the lens with the laser beam is needed for the lens), fine adjustment of the number of supply nozzles and arrangement of the supply nozzles takes time, and a problem of a size increase of the apparatus has occurred. Moreover, a problem that a moving direction of the laser machining head is limited in an arrangement relationship between the supply nozzle and an optical fiber and a problem that a fine shape such as a small hole cannot be welded has also occurred. As described above, in the conventional laser machining method, it is extremely difficult to mount the laser machining head capable of the multi-axis rotation and multi-axis movement and to make a film on the base material having a complicated shape.

In addition to the aforementioned problems, problems (1) to (5) described below have emerged in a film-making technique. That is, (1) a base material component is melted by excessive heat input into the base material, a component of the molten material is diluted by the base material component, a build-up welded portion is deteriorated, and durability is lowered; (2) when the base material is thin or a size of the base material is small, if the molten material is heated/melted on the base material or in the vicinity of the base material, the base material is deformed by the heat; (3) when making a film on a molten material having a melting point higher than that of the base material, if a laser beam with an intensity that can heat/melt the molten material is irradiated on the base material or in the vicinity of the base material, the base material is excessively deformed; (4) when the molten material is to be molten on the base material or in the vicinity of the base material, melting time takes long, and it is thus difficult to form an extremely thin film; and (5) when the molten material is to be welded to the surface of the base material, if a temperature change is rapid on a spot where build-up welding is to be carried out, a thermal stress occurs, and a crack can occur on the surface.

In order to solve the aforementioned problems, measures such that the excessive heat input is not given to the base material by warming the molten material in advance or a preheating step of warming the base material in advance so that a rapid temperature change is not given to the welding spot and a post-heating step of not cooling the base material rapidly have been taken but they need a plurality of heating apparatuses, which increases a size of the apparatus.

Thus, the applicant of this application has found out, after keen studies relating to the aforementioned problems, that (A) by carrying out the build-up welding by arranging the supply nozzle at the center and by applying the laser beam to the molten material supplied from the supply nozzle from a periphery, the molten material can be build-up welded accurately on the surface of the base material having a complicated shape without limiting a moving direction of the laser machining head capable of the multi-axis rotation and multi-axis movement; (B) by using a plurality of laser beams, that is, a first laser beam for heating the base material surface and for ensuring adhesion of the film, a second laser beam for melting the molten material in advance without direct irradiation to the base material surface, and a third laser beam for warming the base material surface, excessive heat input to the base material can be prevented, and the problem of the film-making technique such as reduction in durability caused by the rapid temperature change can be solved; and (C) by arranging the supply nozzle at a center of a condenser lens and by arranging the laser beam around the supply nozzle, a size of the apparatus is reduced and simplified, and even if a plurality of laser beams is controlled, a light condensing position, a light condensing angle, a light condensing diameter and the like can be easily adjusted, and by incorporating the techniques of (A), (B), and (C) in a reduced-sized apparatus capable of the multi-axis rotation and multi-axis movement such as the laser machining head, a film can be made even on the base material having a complicated shape such as a three-dimensional shape, and not only a film but also various and diversified functions such as preheating or post-heating of the base material and warming of the molten material in advance can be realized.

However, in the laser machining apparatuses in Patent Literatures 1 to 5 and 7, although it is described that the supply nozzle is disposed at the center, and the molten material supplied from the supply nozzle is irradiated from the periphery with the laser beam so as to carry out the build-up welding, there is no description or suggestion on use of the laser beam for the purpose of preheating or melting of the molten material separate from the laser beam for making a film.

In the laser machining apparatuses in Patent Literatures 1 to 5 and 7, it is structurally impossible to change a condensing position of the laser beam from a nozzle tip port of the supply nozzle in a height direction up to a welding spot.

As described above, in the prior art, in the laser machining apparatus, such an idea for realizing various and diversified functions such as preheating or post-heating of the base material and warming of the molten material in advance in addition to the film by using a plurality of the laser beams has not been reached.

Moreover, in the laser build-up apparatus in Patent Literature 6, use of the laser beam for melting an additive material and the laser beam inputting heat to the base material is described. However, a fact that incorporating into a laser machining head is possible by reducing a size and by simplifying control of the apparatus is not considered at all.

Thus, an object of the present invention is to provide a laser machining method and a laser machining apparatus which carry out various types of laser machining by: arranging the supply nozzle on a condenser lens or the like; driving, in a controlled manner, a focal position of the laser beam from the optical fiber arranged along the condenser lens on an axis or on a periphery thereof from the nozzle tip port of the supply nozzle toward a welding spot; and stably supplying the molten material and melting it at an optimal machining temperature.

Means for Solving the Problem

The present invention comprises an optical fiber, a condenser lens, and a supply nozzle for supplying a molten material, characterized in that the supply nozzle is arranged so as to penetrate the condenser lens, and the molten material supplied from the supply nozzle is irradiated with a laser beam from the optical fiber on an axis of the condenser lens or on a periphery thereof or on an axis of the supply nozzle or on a periphery thereof.

Here, the phrase "irradiated with the laser beam" in the present invention is not limited to the case of irradiation by condensing the laser beam but also includes a case of irradiation by defocusing, for example. Moreover, "on an axis of a supply nozzle" is preferably matched with "on an axis of a condenser lens" but they do not necessarily have to be matched, and the axis of the supply nozzle may be shifted from the axis (center) of the condenser lens, and either one of them can applies the laser beam by control of the optical fiber.

Moreover, the present invention comprises a plurality of optical fibers, a condenser lens condensing a laser beam of each of the optical fibers, and a supply nozzle for supplying a molten material by injection, characterized in that the supply nozzle is arranged so as to penetrate the condenser lens, the optical fibers are arranged on the periphery thereof, and the molten material supplied from the supply nozzle is irradiated with the laser beam from the optical fiber at least on an axis between a nozzle tip port and a welding spot on an axis of the condenser lens or on a periphery thereof.

Moreover, the phrase in the present invention, "on an axis between a nozzle tip port of a supply nozzle and a welding spot" means not only on the axis between the nozzle tip port of the supply nozzle and the welding spot but means on the axis or on a straight line passing through the nozzle tip port and the welding spot. Therefore, it may include an axis farther than the welding spot when seen from the nozzle tip port.

According to the present invention, the laser beam can be applied to have an optimal melting temperature and can be supplied to the welding spot in a process of the molten material from the supply nozzle to the welding spot. Moreover, not only on the axis passing through the nozzle tip port and the welding spot and on the periphery thereof but also a surface or a deep part of a welding member can be irradiated, an irradiation depth can be adjusted in a thickness direction of the welding member, and machining such as welding can be carried out in an optimal molten state of the molten material by these linking operations.

Moreover, in the case of laser irradiation in a defocused state, defocusing can be carried out by focusing the laser beam in a range from the nozzle tip port to the welding spot, and the defocusing can be also carried out by focusing the laser beam to a region farther than the welding spot when seen from the nozzle tip port. By carrying out laser irradiation in the defocused state, the irradiation region can be wholly warmed, and heat propagation can be also reduced. In the case of build-up welding to the base material such as stainless using a different material such as copper as the molten material, for example, if the base material is heated at a temperature for heating/melting copper, deformation or discoloration can occur easily on the base material. Thus, it is important to independently adjust a wavelength, output, and a condensing diameter of the laser beam for heating the base material appropriately, but heat propagation can be suppressed by heating the base material appropriately by defocusing, and deformation or discoloration can be suppressed. Moreover, even if the base material and the molten material are the same type of metal, when the base material having a shape such as a thin plate which can be distorted easily, heat propagation is reduced by defocusing, and distortion is suppressed.

As the molten material, a powder material such as metal or a wire (rod-shaped metal material) is used as the molten material. Note that the metal material does not necessarily have to be constituted only by metal but may contain non-metal such as ceramics.

According to the present invention, the plurality of laser beams projected from the plurality of optical fibers passes through a center of the corresponding collimator lenses, respectively, and the plurality of laser beams having passed through the collimator lenses travels in parallel with the supply nozzle as it is and passes through the condenser lens. The laser beams having passed through the condenser lens are applied to the axis between the nozzle tip port of the supply nozzle and the welding spot.

According to the present invention, by supplying the molten material from the supply nozzle at the center, the supply of the molten material to an object to be welded is carried out stably. And according to the present invention, the molten material can be irradiated with the laser beam on the axis from injection from the nozzle tip portion of the supply nozzle to the welding spot of the base material, but by irradiating a plurality of points on the axis between the nozzle tip port and the welding spot or by irradiating the entire region according to the numbers of the optical fibers and collimator lenses, laser machining such as melting until the welding spot is reached can be realized.

The present invention is characterized in that the condenser lens through which the supply nozzle penetrates is arranged at the center, the optical fibers are arranged on the periphery thereof, and the molten material supplied from the supply nozzle is irradiated from the periphery thereof with the laser beam from the optical fibers.

According to the present invention, by applying the laser beam from the plurality of optical fibers to the molten material from the supply nozzle at the center, capable of stable supply, to the center thereof, diameters can be made to correspond to (overlapped with) the molten material at the center or irradiation can be made to the molten material at the center from the periphery toward the center and thus, efficient and accurate irradiation/melting is realized. That is, with respect to the molten material from the supply nozzle at the center, the laser beam projected from the periphery thereof is directed onto the axis thereof through the condenser lens (the laser beam is directed to a direction of the molten material at the center without interposing a reflection mirror or the like between them) and thus, the molten material can be accurately supplied onto the optical axis of the laser beam. As a result, melting of the molten material is carried out accurately.

Moreover, according to the present invention, a plurality of the laser beams applied from the plurality of optical fibers travels in parallel with the supply nozzle and passes through the center of each of the corresponding collimator lenses, and the plurality of the laser beams having passed through the collimator lenses continuously travels in parallel with the supply nozzle and passes through the condenser lens. The laser beams having passed through the condenser lens can be applied onto the axis between the nozzle tip port of the supply nozzle and the welding spot so that they can be applied in the parallel arrangement as described above. Therefore, the irradiation while keeping the plurality of optical fibers in the parallel arrangement can be carried out so as to follow the supply nozzle, and the size reduction of the apparatus can be realized.

As the present invention, it is preferable that the plurality of optical fibers comprises a control member for driving control in parallel with respect to the supply nozzle or comprises a control member for driving control with respect to a radial direction of the condenser lens.

According to the present invention, the optical fiber can adjust a condensing angle by moving in a radial direction of the condenser lens in synchronization with the collimator lens. Since the collimator lens and the optical fiber are contained in a range of a diameter of the condenser lens, welding can be carried out while the condensing angle is adjusted over time without increasing a size of the apparatus larger than the size of the condenser lens. For example, in a case where the present invention is mounted on a machining head that performs turning driving, even if a powder-state molten material changes its drop direction, such a structure can be obtained that the supply direction of the molten material is set easily so that the laser beam follows it by arranging the supply nozzle on the axis of the condenser lens and by applying the laser beam from the periphery thereof through the condenser lens.

The present invention is characterized in that the periphery of the welding spot is irradiated at the same time as the irradiation on the axis by applying the laser beams from the plurality of optical fibers, or the periphery of the welding spot is irradiated before the irradiation on the axis.

The conventional apparatus has the problems that coating (build-up welding) with the molten material having a melting point higher than that of the base material to be welded is difficult and that slow cooling cannot be carried out well. According to the present invention, even if the base material to be welded is thin, the molten material from the nozzle tip port of the supply nozzle can be melted with high accuracy until it reaches the welding spot, and the molten material having the melting point higher than that of the base material to be welded can be used for coating (build-up welding). That is, welding can be carried out without raising a temperature of the welding spot by means of irradiation at a temperature in a middle portion from the nozzle tip port to the base material surface higher than that on the base material surface. Moreover, there is a problem that slow cooling cannot be carried out well in hard facing build-up or welding of a thick member, but welding machining can be realized while slow cooling is carried out effectively by irradiating the periphery of the welding spot before irradiation on the axis.

Here, it is preferable that: the present invention comprises a plurality of optical fibers, a plurality of collimator lenses through which the laser beams from the plurality of optical fibers pass, a condenser lens condensing each of the laser beams having passed through the plurality of collimator lenses, and a supply nozzle for injecting/supplying a molten material; the supply nozzle is arranged so as to penetrate the condenser lens or the supply nozzle is arranged capable of driving control in a state penetrating the condenser lens; and the plurality of optical fibers are arranged in parallel along the supply nozzle.

According to the present invention, irradiation can be made while keeping the plurality of optical fibers in the parallel arrangement so as to follow the supply nozzle, and size reduction of the apparatus can be realized. Moreover, an entire region from where the molten material is injected from the nozzle tip port of the supply nozzle to the welding spot of the base material can be irradiated with the laser beam. A plurality of points between welding spot and the nozzle tip port can be irradiated according to the numbers of the optical fibers and the collimator lenses.

It is preferable that, as the present invention, the condenser lens through which the supply nozzle penetrates is arranged at the center, the optical fibers are arranged on the periphery thereof, and the molten material supplied from the supply nozzle is irradiated from the periphery thereof with the laser beam from the optical fiber.

According to the present invention, by applying the laser beams from the plurality of optical fibers to the molten material toward the center thereof from the supply nozzle at the center, diameters can be made to correspond to each other with respect to the molten material at the center and the irradiation can be made to the molten material at the center from the periphery toward the center and thus, efficient and accurate irradiation/melting is realized.

It is preferable that, as the present invention, the collimator lens comprises a control member for driving control in parallel with respect to the supply nozzle or comprises a control member for driving control in the radial direction with respect to the condenser lens.

It is preferable that, as the present invention, the plurality of collimator lenses are arranged on the periphery of the supply nozzle and are driven/controlled in parallel or in the radial direction of the condenser lens in the periphery of the supply nozzle.

According to the present invention, by moving the collimator lenses in parallel in the periphery of the supply nozzle, a distance between the optical fiber and the collimator lens can be adjusted while the parallel arrangement of the optical fiber with respect to the supply nozzle is maintained, and a condensing position in a center axis direction can be adjusted. Therefore, the laser beam can be applied over time from the supply nozzle to the welding spot without increasing the size of the apparatus. Note that, it is preferable that, as the present invention, the plurality of collimator lenses is detachable. According to the present invention, the condensing diameter of the laser beam on the base material surface can be adjusted by replacing the collimator lens to the one with a different focal distance.

The present invention is characterized by comprising the control member for moving the condenser lens which the supply nozzle penetrates or by comprising the control member for moving the supply nozzle penetrating the condenser lens. It is preferable that, as the present invention, the supply nozzle is vertically driven/controlled with respect to the radial direction of the condenser lens.

According to the present invention, since the nozzle tip port of the supply nozzle can be moved in the condenser lens direction or in an irradiation point direction of the base material surface, the nozzle tip port can be brought closer to the irradiation point without changing the distance from the condenser lens to the irradiation point. Therefore, an injection range or an injection amount of the molten material to the base material surface can be made constant regardless of the focal distance of the laser beam.

As the prevent invention, it is preferable that the supply nozzle comprises a driving mechanism so that a position penetrating a center axis or the vicinity of the center axis of the single condenser lens can be adjusted.

According to the present invention, since the molten material can be input to a rear from the laser irradiation region with respect to a welding advancing direction by arrangement in the vicinity of the center axis, efficient irradiation can be made to the molten material or to the base material surface.

The laser machining apparatus of the present invention comprises the optical fiber, the condenser lens, and the supply nozzle for supplying the molten material and is characterized in that the supply nozzle is arranged so as to penetrate the condenser lens, and the molten material supplied from the supply nozzle is irradiated with the laser beam on the axis of the condenser lens or on the periphery thereof or on the axis of the supply nozzle or on the periphery thereof.

Here, it is preferable that, the present invention preferably comprises: means for moving each of the optical fibers in parallel with respect to the supply nozzle and for driving control each of the optical fibers in the radial direction of the condenser lens; means of attaching and detaching the optical fiber replaceable with an optical fiber for a laser with different wavelength; means for making the collimator lens parallel to the supply nozzle and moving it in a radial direction with respect to the condenser lens; and moving means for moving the supply nozzle vertically with respect to the radial direction of the condenser lens and adjusting a penetration position to the center or the vicinity of the center of the condenser lens, thereby adjustment of the condensing angle, adjustment of the laser beam wavelength, adjustment of the condensing diameter, adjustment of an injection distance from the nozzle tip port of the injection supply nozzle to the welding spot, and adjustment of an injection supply position can be achieved. And as the present invention, it is preferable that an object to be welded is arranged on a lower side, the laser machining apparatus described above is arranged above it, the supply nozzle is arranged on the center axis thereof, and the molten material which is the powder material is dripped from the nozzle tip port of the supply nozzle and supplied to the object to be welded.

According to the present invention, even if the material to be supplied is the powder material, the molten material can be supplied in the drip direction and moreover, stably from the center.

The present invention is characterized in that the condenser lens is configured by dividing the single condenser lens into a plurality, and a movable region in which the supply nozzle can be moved is provided at the center thereof.

The present invention is assembled from the divided condenser lenses, and the supply nozzle can be moved at the center thereof, and the supply nozzle can be moved without actually penetrating the condenser lens. Note that the number of the condenser lenses of the present invention is not limited to single.

The present invention is characterized in that the supply nozzle is made of a laser beam transmissive material and transmits the laser beam through the molten material or a converging gas.

According to the present invention, by using a light transmissive material which transmits the laser beam as a material for the supply nozzle, even if the laser beam is applied to the axis of the condenser lens or in the vicinity of the periphery from a side, the laser beam is transmitted without being shielded by the supply nozzle or the nozzle tip port and thus, the vicinity of the nozzle tip port of the supply nozzle can be irradiated with the laser beam. Moreover, even if the distance from the nozzle tip port to the welding spot is short, melting by the laser beam irradiation can be made before injection from the nozzle tip port.

The present invention is characterized in that the supply nozzle comprises converging gas supply means, and the converging gas supply means injects the converging gas from the side of the supply nozzle so that the molten material is converged at least on the axis between the nozzle tip port and the welding spot.

The "converging gas" here is clearly discriminated from a "carrier gas" in this Specification. The "carrier gas" is a gas for carrying the powder material or the molten material and refers to a jet flow ejected from a nozzle center. On the other hand, the "converging gas" refers to a gas ejected from the side for converging this jet flow. Therefore, the carrier gas is ejected for carrying the molten material, and the converging gas is ejected for converging the jet flow generated by ejecting the carrier gas. Note that the converging gas may include an action as the carrier gas, that is, an action for carrying the molten material.

Moreover, in this Specification, the "converging" refers to collecting the jet flow which tends to advance while spreading to the center. This "converging" refers to a state of linearly collecting the molten material along the axis unless otherwise noted but may include a state of collection at least on a single point on the axis as the center such as a state of collecting the molten material at the single point on a base material plane, for example.

Moreover, the present invention is characterized in that, in the supply nozzle constituted by an inner pipe nozzle for supplying the molten material and an outer pipe nozzle disposed on an outer periphery of the inner pipe nozzle, a channel for the converging gas is provided between the inner pipe nozzle and the outer pipe nozzle.

According to the present invention, a converged region of the molten material is linearly elongated on the axis of the condenser lens and in the vicinity of the periphery thereof from an injection port of the supply nozzle to the welding spot, whereby a region (core length) with a high injection pressure of the molten material suitable for the laser beam irradiation is kept long, and the axis of the condenser lens can be irradiated with the laser beam easily. The laser machining apparatus of the present invention can apply the laser beam onto the axis of the condenser lens and the vicinity thereof from the injection port of the supply nozzle to the welding spot and thus, it can be considered to have arrangement configuration suitable for an effect of the present invention.

The present invention is characterized in that the supply nozzle includes the converging gas supply means and supply nozzle injection control means for controlling at least any one of the injection amount, the injection speed, and the injection range of the molten material, and the converging gas supply means includes converging gas injection control means for controlling at least any one of the injection amount, the injection speed, and the injection range of the converging gas.

According to the present invention, a converged region of the molten material can be adjusted. Moreover, an effect of converging the jet flow of the molten material (jet-flow converging effect) can be obtained by making an injection pressure of the converging gas of the converging gas injection control means higher than the injection pressure of the molten material by the supply nozzle injection control means. And control corresponding to the condensing position, the condensing angle, and adjustment of the condensing diameter of the laser beam can be executed.

Advantageous Effect of the Invention

According to the present invention, the molten states of the molten material, which is at a center, and the base material components can be adjusted separately or at the same time by the laser beam irradiation, and a machining position (base material position) can be heated by irradiation and adjusted in advance. Therefore, the problems having occurred in the conventional powder-supply continuous apparatus and powder-supply integrated apparatus can be solved. For example, the problem of the conventional apparatus can be suppressed that a component of a film may be diluted by the base material component and deteriorated so that a fragile compound between the molten materials may be generated in a joint portion. Moreover, an extremely thin film can be also formed easily. Moreover, even if the base material is thin or fine, deformation by heat can be suppressed, and the molten material having a melting point higher than that of the base material can be coated.

Moreover, according to the present invention, since the focal position can be moved onto the axis of the single condenser lens or the supply nozzle or in the periphery thereof, there is no need to dispose the optical fiber diagonally or to arrange a plurality of the condenser lenses, and in the adjustment of the condensing position of the laser beam, the adjustment of the condensing angle, and the adjustment of the condensing diameter, they do not become larger than the diameter of the collimator lens and thus, size reduction of the apparatus can be realized, and adjustment of the laser beam is expedited. Moreover, since the laser beam can move a focal position onto the axis between the nozzle tip port of the supply nozzle and the welding spot or in the vicinity on the axis, the irradiation point of the molten material and the condensing point of the laser beam can be adjusted easily as compared with an apparatus or a method having a structure of supplying the molten material diagonally to the laser machining apparatus, and thermal melting can be applied to the molten material more easily. Thus, the machining of a complicated shape or fine machining can be applied more easily. And by arranging the supply nozzle on the axis of the condenser lens and by applying the laser beam from the periphery thereof through the condenser lens, such a structure can be obtained that setting can be made easily so that, even if the supply nozzle is mounted on the machining head that performs turning driving, the laser beam can follow the supply direction of the molten material.

Moreover, according to the present invention, since the condenser lens and the supply nozzle are integrated, the size of the apparatus is reduced as compared with an apparatus in which the condenser lens and the powder supply function are separated. Even as compared with an apparatus in which they are not integrated, the molten material can be continuously supplied to a laser beam irradiation position, and film-forming efficiency is high.

BRIEF DESCRIPTION OF THE DRAWINGS

FIGS. 19A and 18B are a side view and a plan view illustrating another build-up welding example using the plurality of optical fibers in the embodiment.

DETAILED DESCRIPTION OF THE INVENTION

Specific embodiments to which the present invention is applied will be described in detail with reference to the attached drawings.

(Basic Structure of First Embodiment)

Figure 1:
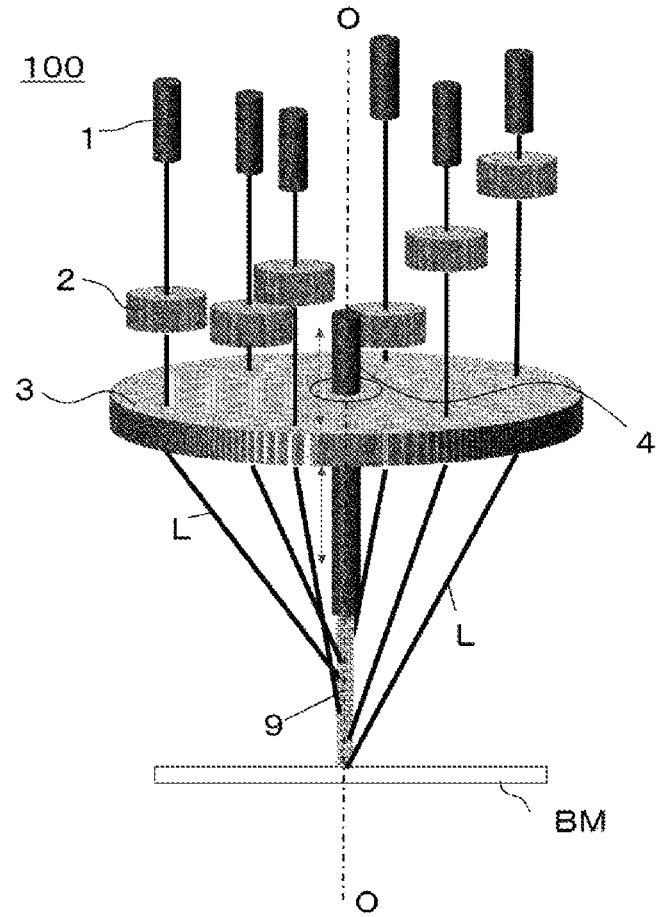
FIG. 1 is a perspective view illustrating a laser machining apparatus of a first embodiment to which the present invention is applied.
Figure 2:
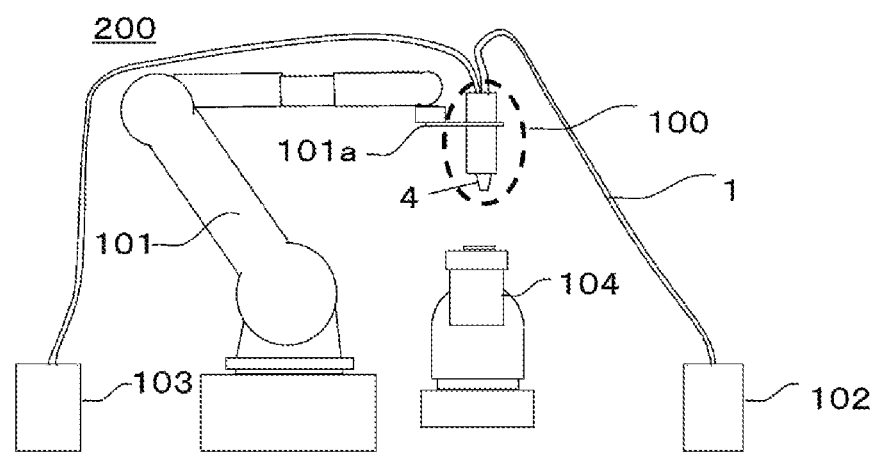
FIG. 2 is a side view illustrating a laser machining system of the embodiment.
Figure 3:
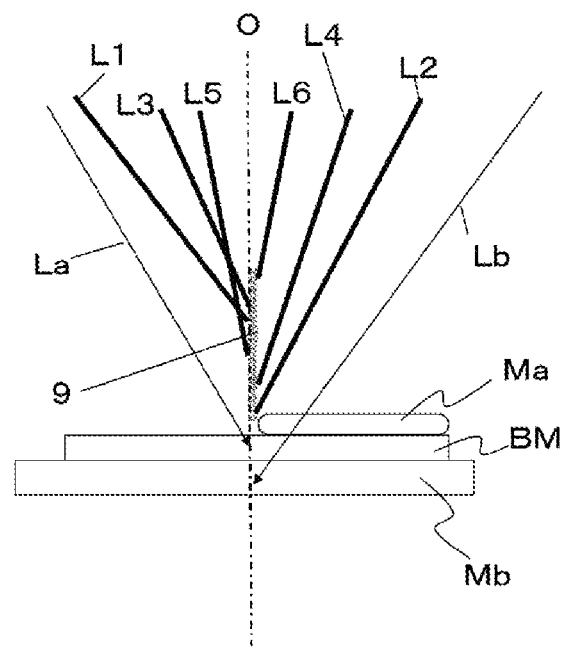
FIG. 3 is a view for explaining an example of build-up welding by the laser machining apparatus of the embodiment.
Figure 4:
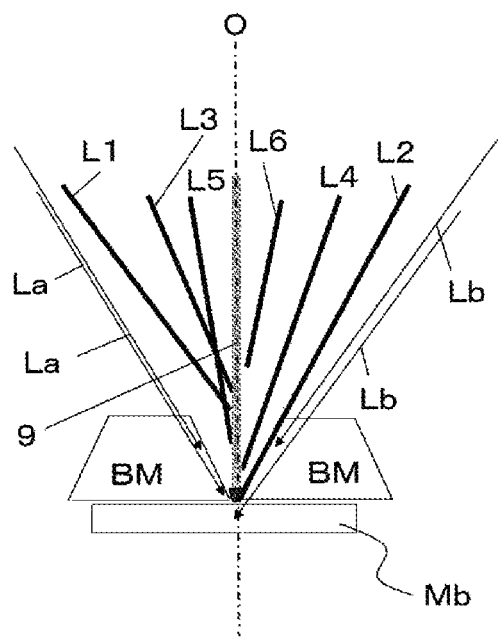
FIG. 4 is a view for explaining an example of another build-up welding by the laser machining apparatus of the embodiment.

FIG. 1 illustrates a laser machining apparatus which is an embodiment of the present invention. FIG. 2 is a side view of a laser machining system of the embodiment. FIG. 3 is a side view illustrating a welding example of the laser machining apparatus of the embodiment. FIG. 4 is a perspective view illustrating another welding example of the laser machining apparatus of the embodiment. The laser machining apparatus 100 of this embodiment includes a plurality of optical fibers 1, a collimator lens 2 for condensing a laser beam ejected from the plurality of the optical fibers 1, a condenser lens 3 for condensing the laser beams having passed through the plurality of collimator lenses 2 into one, and a supply nozzle 4 for injecting/supplying a molten material 9, and the plurality of optical fibers 1 are arranged in parallel in the periphery of the supply nozzle 4 (FIG. 1).

The laser machining apparatus 100 of this embodiment is attached to a laser machining head portion 101a of a multi-axis articulated robot 101 in a three-dimensional laser machining system 200 as illustrated in FIG. 2. The three-dimensional laser machining system 200 is composed of the multi-axis articulated robot 101 to which the laser machining apparatus 100 is attached, a laser oscillating apparatus 102, a molten material supply apparatus 103, and a machining table 104, and the laser machining head portion 101a is configured capable of multi-axis rotation (FIG. 2). The multi-axis articulated robot 101, the laser oscillating apparatus 102, and the molten material supply apparatus 103 are provided with power supplies, and the machining table 104 is configured capable of multi-axis rotation.

The laser beam output from the laser oscillating apparatus 102 is transmitted to the laser machining apparatus 100 by the optical fiber 1, thereby the laser beam L is ejected from the optical fiber 1 of the laser machining apparatus 1 illustrated in FIG. 1. Moreover, the molten material supply apparatus 103 is connected to a supply nozzle 4 of the laser machining apparatus 100 illustrated in FIG. 1 and supplies a molten material 9 to the supply nozzle 4 (FIGS. 1 and 2).

In this embodiment, the present invention is applied to the build-up welding. The build-up welding/thermal spraying is one of surface reforming techniques and is a technique covering a surface of metal with a film of a different kind of metal, ceramic, cermet or the like by welding or spraying of molten metal (molten material) for the purpose of abrasion resistance, corrosion resistance, heat resistance, insulation or the like. It is also applied to repair of a component which has been corroded and is not in use due to corrosion or abrasion. Metal with required composition and a dimension (particularly a thickness) according to the purpose is welded to the surface of the base material (a metal material to be welded or a metal material to be cut). This technique is characterized in that a firm adhesion force is obtained since the base material and a welding material are alloyed by welding and that a thick film can be formed without limitation on a thickness of a build-up layer and is the surface reforming technique suitable for a location susceptible to a large load or an impact.

The plurality of collimator lenses 2 is arranged in parallel on the periphery of the supply nozzle 4 so that the laser beam from each of the optical fibers 1 passes through the center of the collimator lens 2 and is driven in a parallel attitude. The diameter of the collimator lens 2 is equal to or smaller than a radius of the condenser lens 3 and is arranged perpendicularly to the supply nozzle 4 similarly to the condenser lens 3.

The diameter of the collimator lens 2 is equal to or smaller than a half of the condenser lens 3, and outer peripheral portions of the plurality of collimator lenses 2 are contained within a range of the diameter of the condenser lens 3, and the plurality of optical fibers 1 can move in parallel in a parallel arrangement with respect to the supply nozzle 4. Thus, however the optical fiber 1 and the collimator lens 2 are driven, they do not become larger than the diameter of the condenser lens 3. It is preferable that the optical fiber 1 and the collimator lens 2 are attached to a detachable member, respectively, and the detachable member is attached to a control member. By including them, they are configured to be driven/controlled in parallel on the periphery of the supply nozzle 4 or with respect to the condenser lens 3. The condenser lens 3 includes the supply nozzle 4 for injecting/supplying the molten material 9 onto the optical axis at a center thereof (FIG. 1).

The supply nozzle 4 is arranged so as to penetrate the condenser lens 3. The supply nozzle 4 may be capable of driving control in a state penetrating the condenser lens 3. As described above, the supply nozzle 4 is arranged so as to penetrate almost the center of the condenser lens 3 perpendicularly, and the collimator lens 2 is arranged on the periphery of the supply nozzle 4 so as to be in parallel with the condenser lens 3 (FIG. 1). The optical fibers 1 are arranged on the periphery of the supply nozzle 4 in parallel at an equal interval. The optical fiber 1 and the collimator lens 2 are arranged so as to be contained in the range of the diameter of the condenser lens 3. As the molten material 9, a powder material such as metal is used, but a wire or the like can be also used as the molten material.

In this embodiment, the laser beam L projected from the optical fiber 1 passes through the collimator lens 2 and then, is condensed by the condenser lens 3, and the laser beam L is applied to a base material BM and the molten material 9 at a position separated by a predetermined distance. Regarding the collimator lens 2 and the condenser lens 3, the laser beam L having passed through the collimator lens 2 is applied onto the axis O from a nozzle tip port 4a of the supply nozzle 4 to a base material surface. FIG. 3 is a view for explaining an example of the build-up welding by the apparatus 100 in the first embodiment. On a tip side of a welding member Ma disposed on the base material BM, the molten material 9 is dropped (injected/dropped) in a perpendicular attitude, and a laser beam La is applied in a range up to the welding spot. Although the laser beam is projected from the plurality of optical fibers 1, it can be applied not only onto the axis O but also to the periphery thereof (see the laser beam La arrow in FIG. 1). Reference character Mb is a backing plate. FIG. 4 is a view for explaining another example of the build-up welding. The molten material 9 is supplied into a groove between the base material BM and the base material BM, and the laser beam La is applied in the range of the axis O to the welding spot. Although the laser beam is projected from the plurality of optical fibers 1, this is an example that not only the axis O but also the periphery thereof is irradiated (see the laser beam La arrow in FIG. 1).

Second Embodiment

Figure 5:
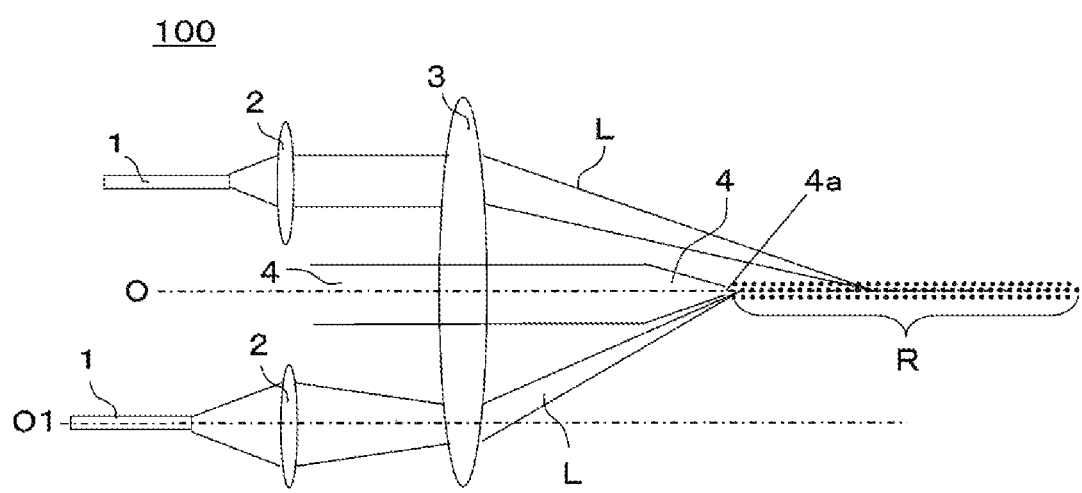
FIG. 5 is a side view illustrating a laser machining apparatus of a second embodiment to which the present invention is applied.

FIG. 5 is a side view illustrating the laser machining apparatus 100 of this embodiment. The laser machining apparatus 100 includes a plurality of optical fibers 1, a plurality of collimator lenses 2 for condensing the laser beams L ejected from the plurality of optical fibers 1, a condenser lens 3 for condensing the laser beam L having passed through the collimator lens 2 into one, and a supply nozzle 4 penetrating almost the center of the condenser lens 3, and the optical fibers 1 are arranged in parallel on the periphery of the supply nozzle 4 (FIG. 5).

In the laser machining apparatus 100 of this embodiment, while the optical fiber 1 and the collimator lens 2 are arranged in parallel with the supply nozzle 4, that is, while the optical fiber 1 and an axis O1 of the collimator lens 2 and the axis O of the condenser lens are in parallel with each other, the laser beam L is ejected from the optical fiber 1 and condensed on the axis O of the condenser lens 3 or on the periphery thereof from the nozzle tip port 4a to the welding spot (FIG. 5).

FIG. 5 is a side view of the build-up welding by applying the laser beam L to the side by using the two optical fibers 1, and since the laser beam L is ejected from the optical fibers 1 while spreading, some condensing system is usually needed, but the light is condensed by using the lens in the present invention. The condensing diameter of the laser beam L can be narrowed smaller by combining the condenser lens 3 and the collimator lens 2, and light condensing performances are improved. The laser beam L projected from the optical fiber 1 passes through the collimator lens 2 and then, is condensed by the condenser lens 3 and is applied onto the axis O of the condenser lens and in the vicinity thereof from the injection port of the supply nozzle 4 toward the welding spot (FIGS. 1 and 5).

The collimator lenses 2 are arranged in parallel on the periphery of the supply nozzle 4 so that the laser beam L from the optical fiber 1 passes through the centers of the collimator lenses 2. The diameter of the collimator lens 2 is equal to or smaller than the radius of the condenser lens 3 and is disposed perpendicularly to the supply nozzle 4 similarly to the condenser lens 3. The diameter of the collimator lens 2 is equal to or smaller than a half of the condenser lens 3, and the outer peripheral portion of the collimator lens 2 is contained in the range of the diameter of the condenser lens 3 (FIG. 5).

Even when the collimator lens 2 is not used, the laser beam L ejected from the optical fiber 1 is applied onto the axis O between the injection port of the supply nozzle 4 and the welding spot by the condenser lens 3. In this case, the condensing diameter of the applied laser beam L is wider as compared with the case where the collimator lens 2 is used.

Figure 6:
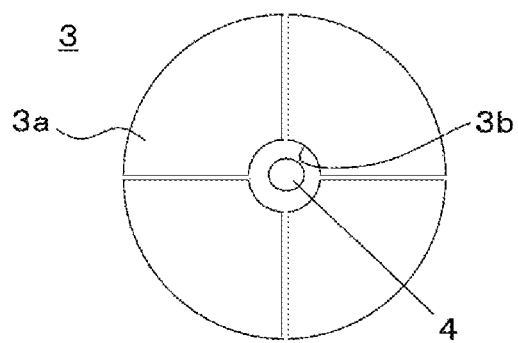
FIG. 6 is a sectional view for explaining a division example of a condenser lens in the embodiment.

The supply nozzle 4 for injecting/supplying the molten material 9 is provided at the center axis or in the vicinity of the center axis of the condenser lens 3 (FIG. 5). FIG. 6 is a sectional view for explaining a division example of the condenser lens 3 in this embodiment. FIG. 5 illustrates a case where the single condenser lens 3 is used, but even if the single condenser lens 3 is divided and used as condenser lenses 3a, the light can be condensed similarly to the case where the single condenser lens 3 is used (FIG. 6).

The nozzle 4 is arranged so as to penetrate almost the center of the condenser lens 3 perpendicularly, and the collimator lenses 2 are arranged around the supply nozzle 4 so as to be in parallel with the condenser lens 3. Moreover, the optical fibers 1 are arranged in parallel around the supply nozzle 4 (FIG. 5). This is a case where the single laser beam L is applied to the tip port 4a of the supply nozzle 4 by making the diameter of the supply nozzle 4 smaller and by making an angle of the nozzle tip port 4a sharp. In this manner, the irradiation to the tip port 4a of the supply nozzle 4 can be made by changing a shape of the tip port 4a of the supply nozzle 4 or by configuring such that the tip of the supply nozzle 4 does not protrude from the condenser lens 3.

Figure 7A:
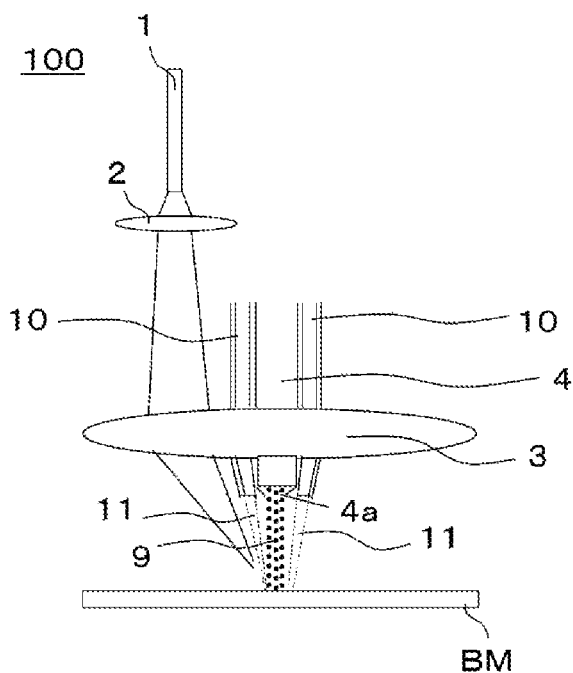
FIGS. 7A and 7B are sectional views for explaining a supply nozzle and a converging gas in the embodiment.
Figure 7B:
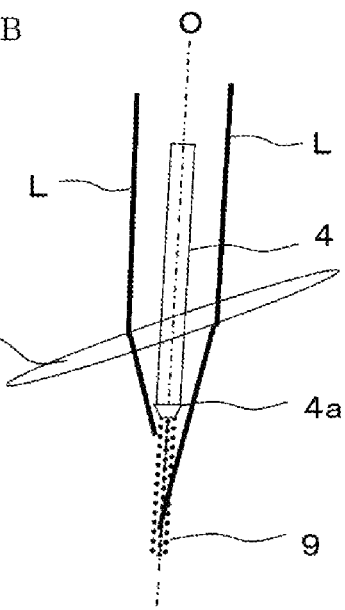

FIG. 7(a) is a sectional view for explaining a case where the converging gas is supplied from the periphery of the supply nozzle 4 in this embodiment. The supply nozzle 4 includes the supply nozzle injection control means (not shown) in order to control injection amount, the injection speed, and the injection range of the molten material 9. Since converging gas supply means 10 is disposed integrally on the periphery of the supply nozzle 4, a converging gas 11 is injected from the periphery of the nozzle tip port 4a of the supply nozzle 4. The converging gas supply means 10 includes the converging gas injection control means so that the injection amount, the injection speed, and the injection range of the converging gas 11 are controlled. The converging gas 11 is used as a shielding gas as it is. Furthermore, another nozzle may be attached in order to improve shielding performances and the gas may be supplied therefrom. Moreover, the supply nozzle 4 may include a recovery nozzle for recovering the molten material 9. Note that the supply nozzle 4 encompasses a double supply nozzle including the converging gas supply means 10 and a multiple supply nozzle including other functions in its meaning and is not limited to a single supply nozzle. Note that a configuration example of the double supply nozzle suitable for the application of the laser beam L from the side to the axis O and the vicinity thereof such as the present laser machining apparatus 100 will be described in detail in Example 4. FIG. 7(b) is a sectional view of a form of an example in which the condenser lens 3 is arranged with inclination. The supply nozzle 4 penetrates the condenser lens 3, and by arranging the condenser lens 3 with inclination the laser beam L of the optical fiber 1 can be applied to the tip port 4a of the supply nozzle 4 more easily.

The supply nozzles 4 may be provided in plural, and may have a structure that a plurality of molten material supply pipes are provided inside the supply nozzle 4. In that case, each of the molten material supply pipes is controlled, and each of the supply nozzles 4 is adjusted to supply the different molten material 9.

Figure 8:
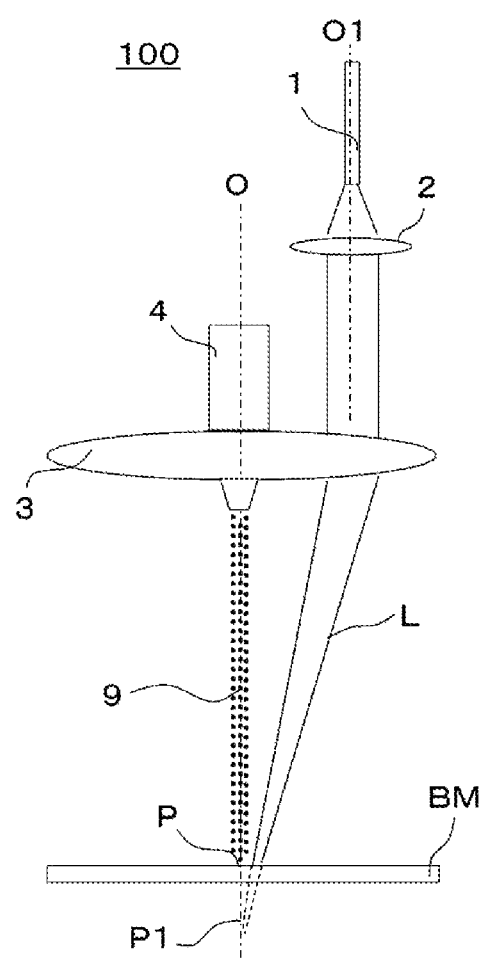
FIG. 8 is a side view illustrating an example of irradiation of a laser beam in a vertical direction by using a single optical fiber in the embodiment.

FIG. 8 is a side view illustrating an example of irradiation of the laser beam in a vertical direction by using the singe optical fiber in this embodiment. The laser powder build-up apparatus 100 of this embodiment is capable of not only irradiation of the laser beam L to the side but also of build-up welding to the base material BM from any direction. The irradiation to a normal line on the base material surface from the perpendicular direction is preferable for efficient laser irradiation, and build-up welding is carried out from above the base material BM by rotatably controlling the machining table 104 illustrated in FIG. 2 or by vertically inverting the base material BM while the base material BM is gripped by the robot. Note that the laser beam L in FIG. 8 is an example in which the laser beam L is condensed to a position P1 on the axis O separated from the position P on the surface of the base material BM so that the laser beam L is applied to the periphery of the molten material 9.

FIGS. 9 to 22 are side views and plan views illustrating the laser machining apparatus 100 in this embodiment. FIGS. 9 to 22 are examples in which the molten material 9, the base material BM, and the backing plate Mb are on the axis O of the condenser lens (not shown), and the laser beam L is applied onto the axis O of the condenser lens while the molten material 9 is supplied.

Figure 9A:
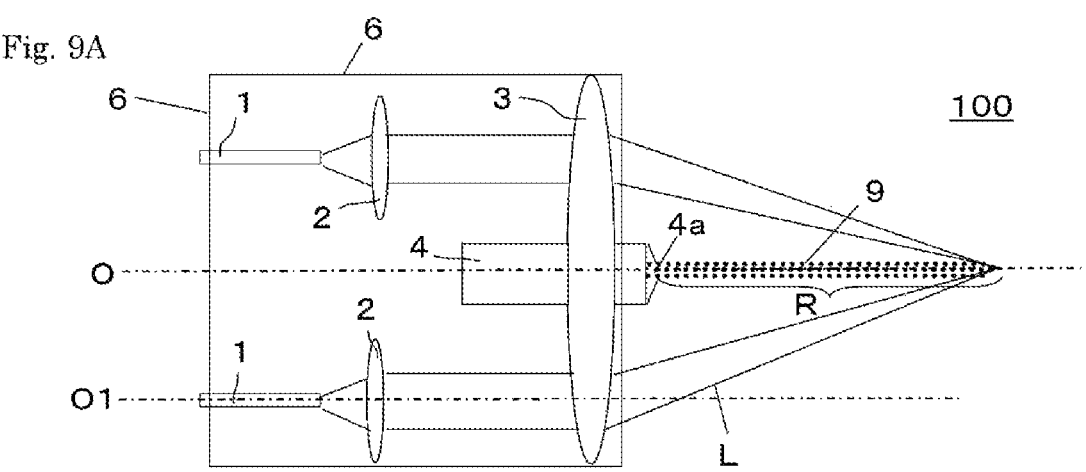
FIGS. 9A and 9B are a side view and a plan view illustrating a housing in the embodiment.
Figure 9B:
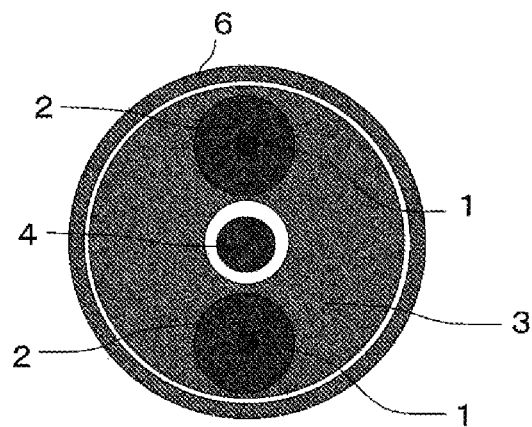

FIG. 9(a) is a side view for explaining a housing in this embodiment, and FIG. 9(b) is a plan view thereof. A laser beam outlet of the optical fiber 1, the collimator lens 2, the condenser lens 3, and the supply nozzle 4 are preferably accommodated inside the housing 6 having a cylindrical shape (FIG. 9). Assuming that the nozzle tip port side of the supply nozzle 4 is a tip side of the housing 6, and a side opposite to that where the optical fiber 1 is located is a rear end side 6b of the housing 6, a plurality of the optical fibers 1 is disposed on the rear end side 6b of the housing 6, and a cable of the optical fiber 1 is arranged to be extended to an outside of the housing 6. The plurality of optical fibers 1 is disposed correspondingly to each of the plurality of collimator lenses 2 so that the laser beam L ejected from the optical fiber 1 passes through the collimator lenses 2 (FIG. 9(a)).

The plurality of collimator lenses 2 is located in the middle between the optical fiber 1 and the condenser lens 3 inside the housing 6 and is disposed so that the laser beam L ejected from the optical fiber 1 is condensed by the condenser lens 3 after passing through the collimator lens 2 (FIG. 9(a)), and the collimator lenses 2 are disposed on the periphery of the supply nozzle 4 (FIG. 9(b)). The condenser lens 3 is disposed on the tip side of the housing 6, and the supply nozzle 4 is disposed so as to penetrate almost the center of the condenser lens 3 (FIG. 9). Note that even if the housing 6 is not used, at least the axis O1 of the collimator lens 2 has a size that passes through the condenser lens 3.

All the optical fiber 1, the supply nozzle 4, and the condenser lens 3 do not necessarily have to be accommodated inside the housing 6, and the housing 6 does not have to have a cylindrical shape. By making the shape of the housing cylindrical, the size of the laser powder build-up apparatus 100 can be reduced, but the shape may be other than cylindrical and can be preferably changed as appropriate according to shapes of the laser machining apparatus 100 and its constituent elements so as to reduce the size and the weight.

Figure 10A:
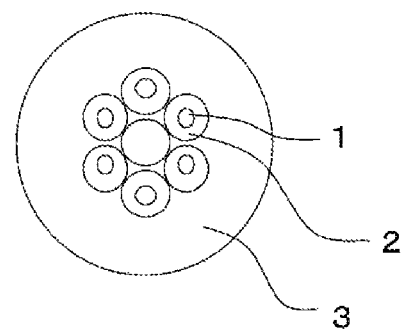
FIGS. 10A and 10B are plan view illustrating an arrangement configuration example of the optical fiber and the condenser lens in the embodiment.
Figure 10B:
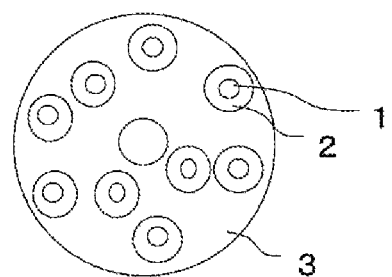

FIG. 10 are plan views illustrating an arrangement configuration example of the optical fiber 1 and the collimator lens 2 in this embodiment. FIG. 10(a) is an example in which the plurality of optical fibers 1 and the plurality of collimator lenses 2 are arranged circularly. FIG. 10(b) is an example in which the plurality of optical fibers 1 and the plurality of collimator lenses 2 are arranged at random in the radius of the condenser lens 3.

In this embodiment, the axis O between the supply port of the supply nozzle 4 to the welding spot can be irradiated in any one of the case where the single optical fiber and the single collimator lens 2 are arranged (FIG. 8), the case where the plurality of optical fibers 1 and the plurality of collimator lenses 2 are linearly arranged (FIG. 9), the case where the plurality of optical fibers 1 and the plurality of collimator lenses 2 are arranged circularly at an equal interval (FIG. 10(*a*)), and the case where the plurality of optical fibers 1 and the plurality of collimator lenses 2 are arranged at random in the radius of the condenser lens 3 (FIG. 10(*b*)).

Figure 11:
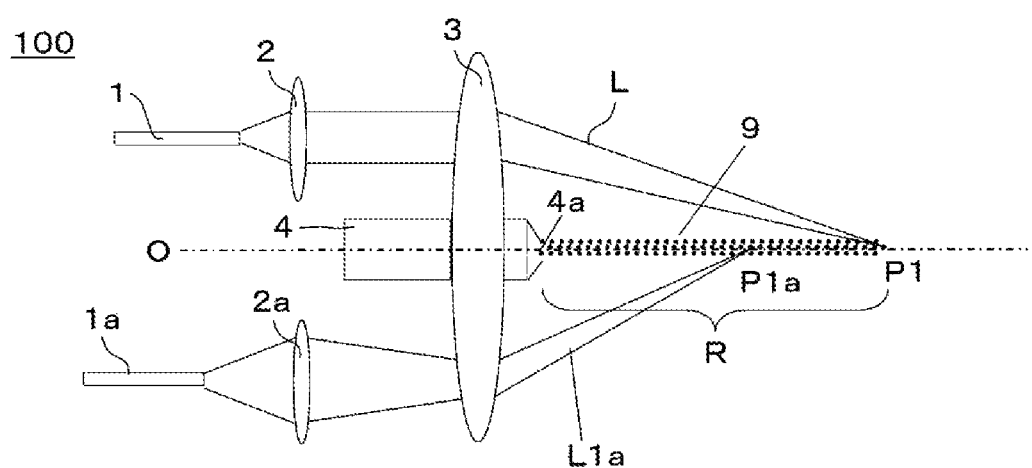
FIG. 11 is a side view for explaining condensing position adjustment in a center axis direction in the embodiment.
Figure 12:
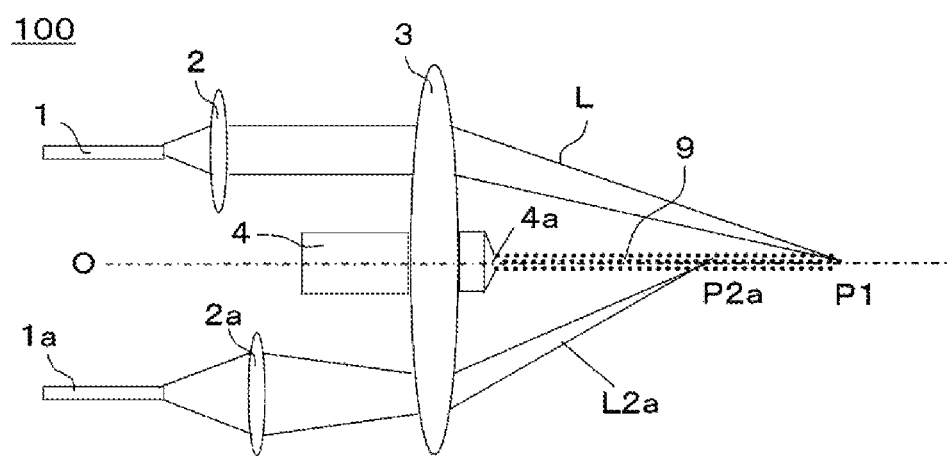
FIG. 12 is a side view for explaining the condensing position adjustment in the center axis direction in the embodiment.

FIGS. 11 and 12 are side views for explaining condensing position adjustment in the center axis direction in this embodiment. FIGS. 11 and 12 are views for explaining that the larger a relative distance between the optical fiber 1 and the collimator lens 2 is, the closer the condensing position of the laser beam is to the tip port 4*a* of the supply nozzle 4 on the axis of the condenser lens, and the smaller the relative distance between the optical fiber and the collimator lens is, the farther the condensing position of the laser beam is from the tip port 4*a* of the supply nozzle 4.

FIG. 11 illustrates a difference in the condensing position if a distance from the collimator lens 2 to the condenser lens 3 is equal to a distance from the collimator lens 2*a* to the condenser lens 3, and a distance from the optical fiber 1 to the collimator lens 2 is different from a distance from the optical fiber 1*a* to the collimator lens 2*a*. The condensing position of the laser beam L projected from the optical fiber 1 is indicated by P1, and the condensing position of a laser beam L1*a* projected from the optical fiber 1*a* by P1*a*.

The optical fiber 1*a* located closer to a rear than the optical fiber 1 is separated from the collimator lens and thus, the condensing position P1*a* of the laser beam L1*a* projected from the optical fiber 1*a* is brought closer to the nozzle tip port 4*a* of the supply nozzle 4 than the condensing position P1 of L1 projected from the laser beam L (FIG. 11).

FIG. 12 illustrate a difference in the condensing positions if the distance from the optical fiber 1 to the condenser lens 3 is equal to the distance from the optical fiber 1*a* to the condenser lens 3 and the distance from the optical fiber 1 to the collimator lens 2 is different from the distance from the optical fiber 1*a* to the collimator lens 2*a*. The condensing position of the laser beam L having passed through the collimator lens 2 is indicated by P1 and the condensing position of a laser beam L2*a* having passed through the collimator lens 2*a* by P2*a*. The collimator lens 2*a* located ahead of the collimator lens 2 is away from the optical fiber 1 and thus, the position P2*a* where the laser beam L2*a* having passed through the collimator lens 2*a* is brought closer to the nozzle tip port 4*a* of the supply nozzle 4 than the position P1 where the laser beam L having passed through the collimator lens 2 is condensed (FIG. 12).

Figure 13:
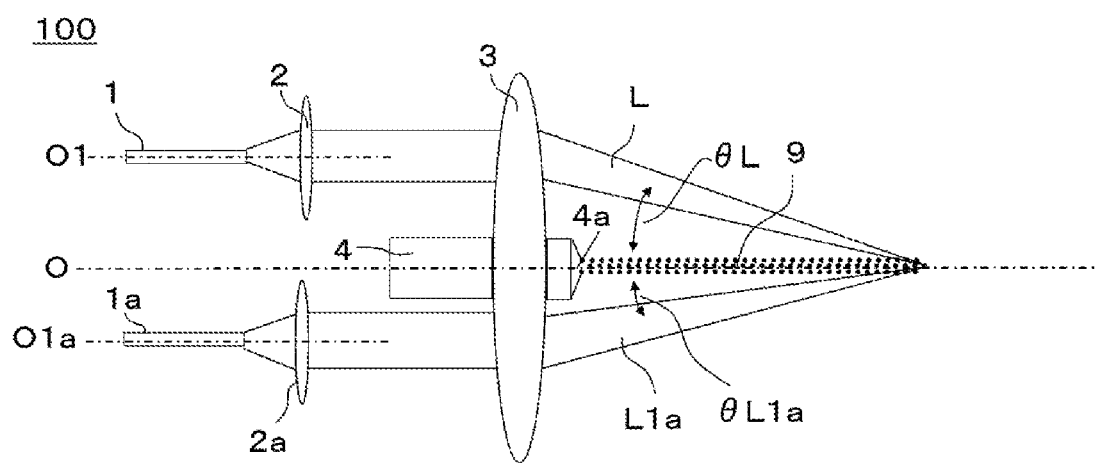
FIG. 13 is a side view for explaining condensing angle adjustment in the embodiment.

FIG. 13 is a side view for explaining condensing angle adjustment in this embodiment. FIG. 13 is a view illustrating that when the optical fiber 1 and the collimator lens are arranged closer to the axis O of the condenser lens, the condensing angle of the laser beam is made smaller.

The optical fiber 1*a* and an axis O1*a* of the collimator lens 2*a* are arranged at positions closer to the axis O of the condenser lens 3 than the optical fiber 1 and the axis O1 of the collimator lens 2 (FIG. 13). In this case, the condensing angle θL1*a* of the laser beam L1*a* projected from the optical fiber 1*a* has the condensing angle smaller than the condensing angle θL of the laser beam L projected from the optical fiber 1 (FIG. 13). When a narrow and small space is to be welded in the laser powder build-up welding, the laser beam with a large condensing angle may not reach the welding spot. However, welding can be realized by making the condensing angle smaller. Moreover, when the condensing angle is made smaller, the laser beam is brought closer to the axis O and thus, the molten material 9 supplied from the supply nozzle 4 and passing through the axis O can be warmed in a wide range. Moreover, the condensing angle can be adjusted without making the size of the apparatus larger than the diameter size of the condenser lens 3.

Figure 14:
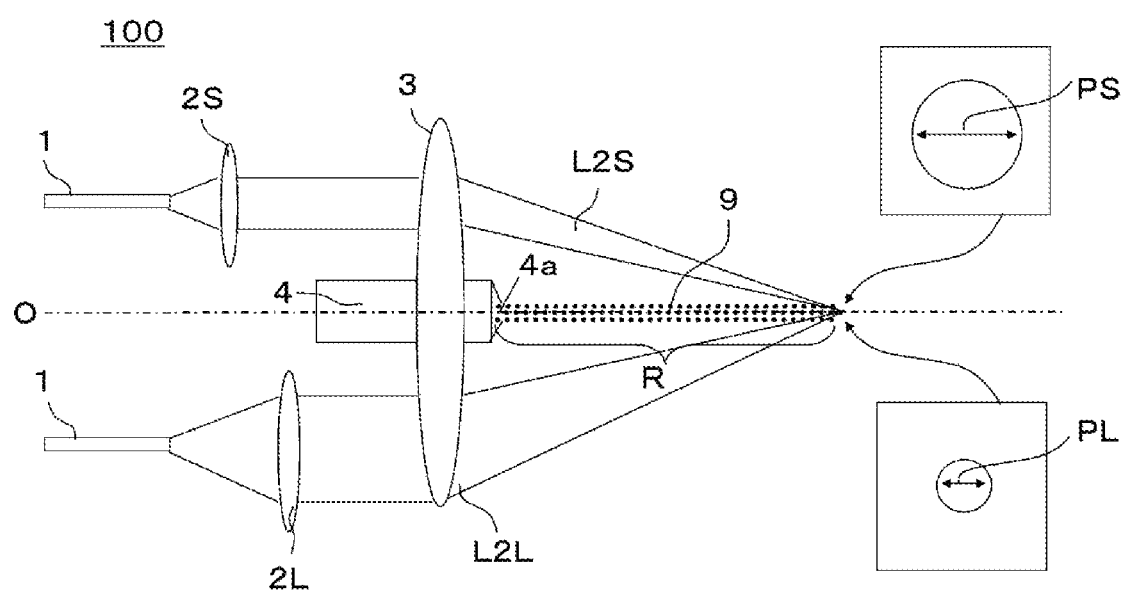
FIG. 14 is a side view for explaining the condensing angle adjustment in the embodiment.

FIG. 14 is a side view for explaining the condensing diameter adjustment in this embodiment. FIG. 14 is a view illustrating a difference in the condensing diameter of the laser beam when the collimator lens 2 with the same distance from the optical fiber 1 to the condenser lens 3 and the different focal distance is used and illustrates that when the collimator lens with a short focal distance is used, the condensing diameter becomes larger.

A diameter of a condensing diameter PL formed by a laser beam L2L when a long-focus collimator lens 2L is used is smaller than a condensing diameter PS formed by a laser beam L2S when a short-focus collimator lens 2S is used (FIG. 14). When the laser irradiation is to be applied to a fine cubic structure in the laser machining, if the long-focus collimator lens 2L is selected and a plane is to be irradiated widely and to be machined in a shorter time, the machining is carried out by using the short-focus collimator lens 2S so as to make the diameter of the irradiation spot of the laser beam smaller. The laser machining work involves rapid cooling, which may break the build-up welded portion. In order to prevent this, slow cooling of the build-up welding portion is needed. The desired slow cooling can be realized by enlarging only the condensing diameter of the laser beam heating the base material and by heating the periphery widely. By carrying out the adjustment of the condensing diameter as above, the build-up welding portion can be slowly cooled.

Figure 15:
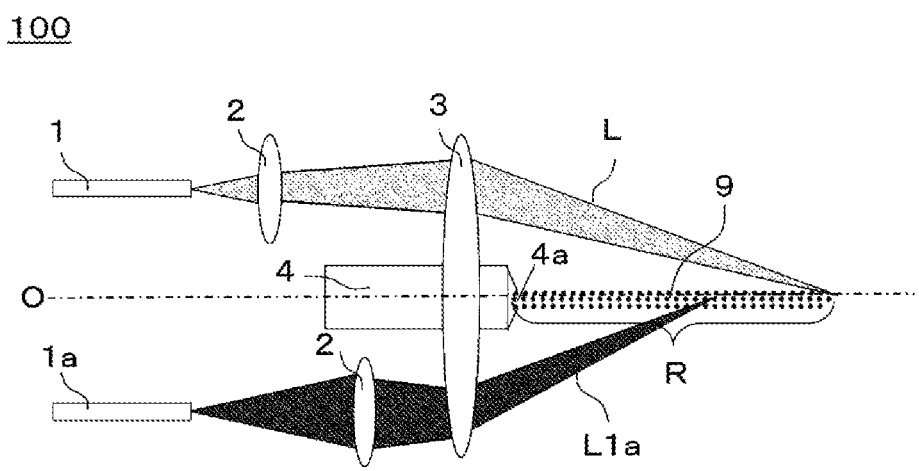
FIG. 15 is a side view when laser beams with different wavelengths are combined in the embodiment.

FIG. 15 is a side view when laser beams with different wavelengths are combined in this embodiment. FIG. 15 is a view for explaining a machining example when the wavelength projected from the optical fiber 1 is different.

The laser beams with different wavelengths are applied by changing the laser beam to be oscillated from the laser oscillating apparatus 102 (FIGS. 2 and 15). Since the wavelengths of the laser beam L projected from the optical fiber 1 and the laser beam L1*a* projected from the optical fiber 1*a* are different, adjustment according to the material and a shape of the base material BM is made. As in the laser machining using a heat exchanger N as the base material BM (FIG. 31(*d*)), if material characteristics are different between the base material BM and the molten material 9, irradiation energy of each laser beam is adjusted in machining. The heat exchanging apparatus N often presents a complicated shape in order to make a surface area as wide as possible, which makes frequent changes of an attitude and a position of the apparatus necessary for the build-up welding, and reduction of size and weight is important. In the laser machining apparatus of the present invention, the laser beam can be replaced with a long-wavelength laser or a short-wavelength laser. Since copper reflects the long-wavelength laser easily and does not absorb energy easily, the short-wavelength laser is needed. On the other hand, since stainless on the base material side absorbs even the long-wavelength laser easily, use of the long-wavelength laser with which a high output is easy is rational.

Figure 16:
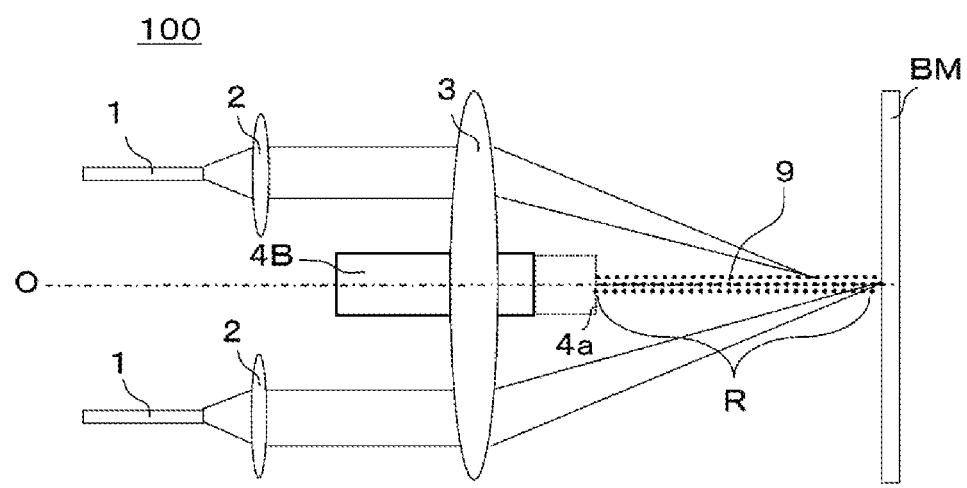
FIG. 16 is a side view for explaining arrangement adjustment of the supply nozzle in the embodiment.
Figure 17:
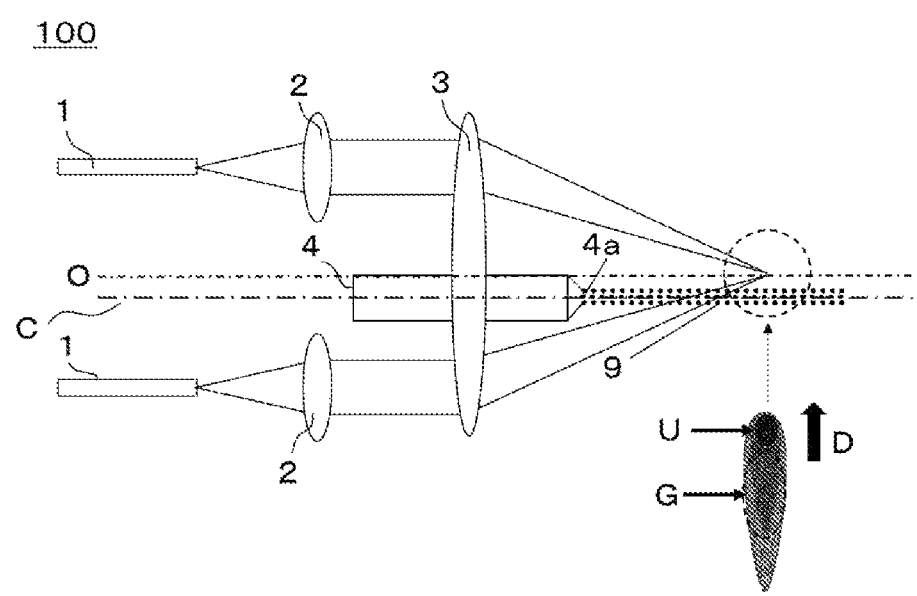
FIG. 17 is a side view for explaining a molten material supply position in the embodiment.

FIGS. 16 and 17 are side views for explaining position adjustment of the supply nozzle 4 in this embodiment.

FIG. 16 illustrates a machining example when the supply nozzle is configured to penetrate almost the center of the condenser lens, and arrangement of the supply nozzle is different on the axis of the condenser lens. As compared with the case of location on the rear side as the supply nozzle 4B, by making the supply nozzle 4 movable and by bringing the nozzle tip port 4*a* closer to the base material BM, injection of the molten material 9 can be brought closer to the irradiation region of the laser beam without changing the condensing angle of the laser beam. The build-up welding is carried out while the molten material 9 is melted stably according to characteristics of the molten material 9, and the molten material injection region is narrowed or widened.

FIG. 17 is a machining example of a case where the axis O of the condenser lens 3 and an axis C of the supply nozzle 4 are shifted from each other and arranged. When the axis C of the supply nozzle 4 is shifted from the axis O (the center axis of the laser machining apparatus) of the condenser lens 3, the supply nozzle 4 is arranged at a position opposite to an advancing direction D of the laser machining apparatus 100, and the molten material 9 is injected, a position directly under the laser beam U and a molten material input position G are shifted from each other and thus, the molten material 9 is injected to a spot on the base material irradiated and heated in advance in the laser build-up welding, and the laser machining process in a short time becomes possible (FIG. 17).

Figure 18A:
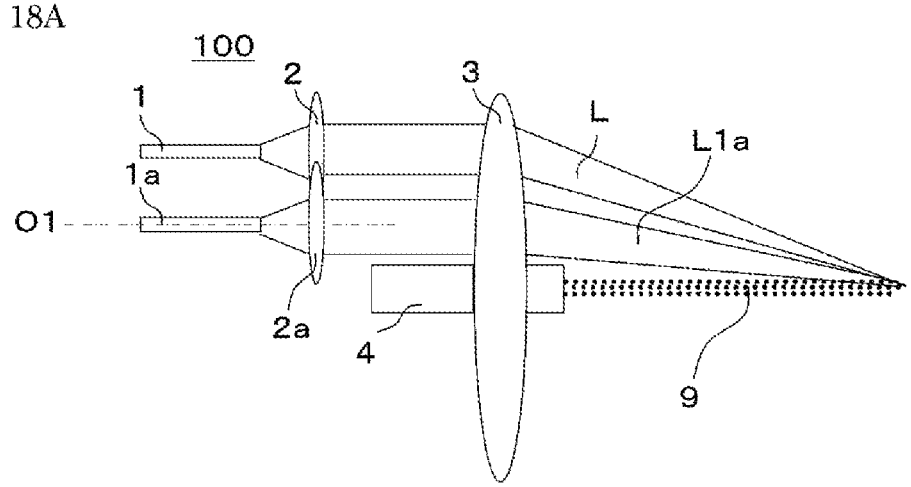
FIGS. 18A and 18B are a side view and a plan view illustrating the build-up welding example using a plurality of optical fibers in the embodiment.
Figure 18B:
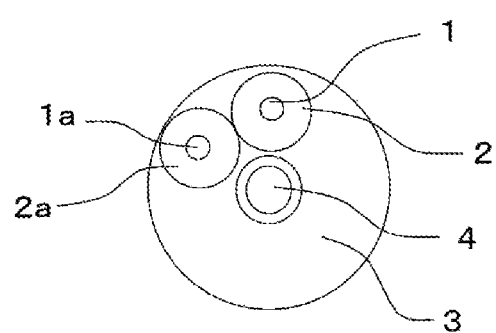
Figure 19A:
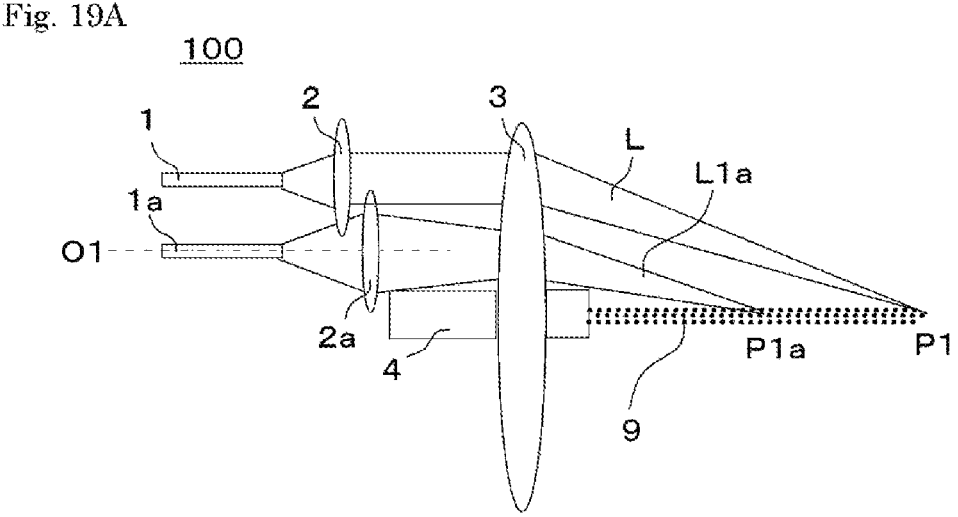
Figure 19B:
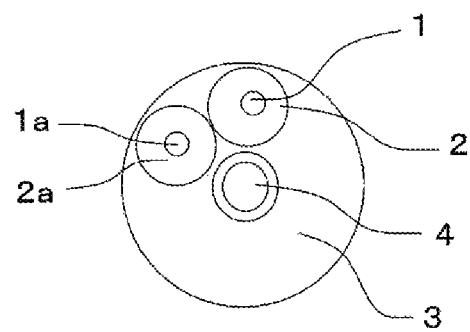

FIGS. 18 to 22 are side views and plan views illustrating a build-up welding example using a plurality of optical fibers in this embodiment. FIG. 18(a) is a side view illustrating an example of machining in which two optical fibers 1 and collimator lenses 2 are arranged at the center of the condenser lens 3 at an equal distance, and FIG. 18(b) is a plan view thereof. FIG. 19(a) is a side view illustrating an example in which one optical fiber 1a and one collimator lens 2a corresponding to that are arranged at different positions on the axis O1 of the collimator lens 2a in the arrangement configuration illustrated in FIG. 18, and FIG. 19(b) is a plan view thereof. Similarly to the case illustrated in FIG. 11, since the distance from the optical fiber 1a to the collimator lens 2a is large, only the laser beam L1a projected from the optical fiber 1a is brought closer to the direction of the nozzle tip port 4a of the supply nozzle (FIG. 18(a) and FIG. 19(a)).

Figure 20A:
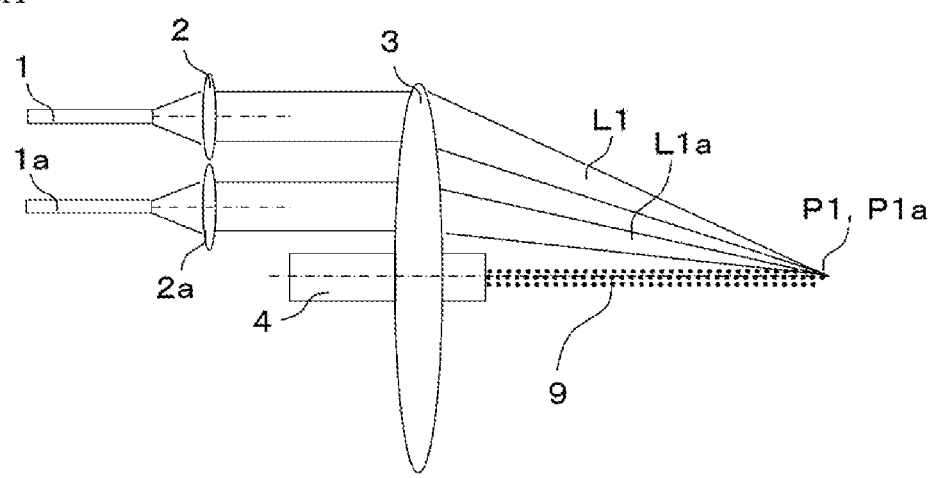
FIGS. 20A and 20B are a side view and a plan view illustrating another build-up welding example using the plurality of optical fibers in the embodiment.
Figure 20B:
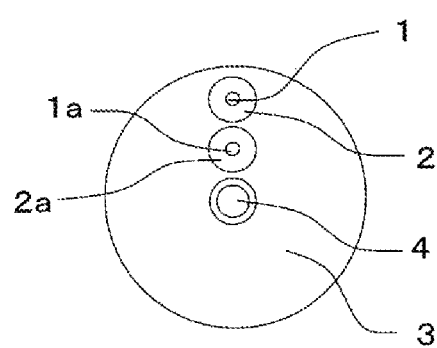
Figure 21A:
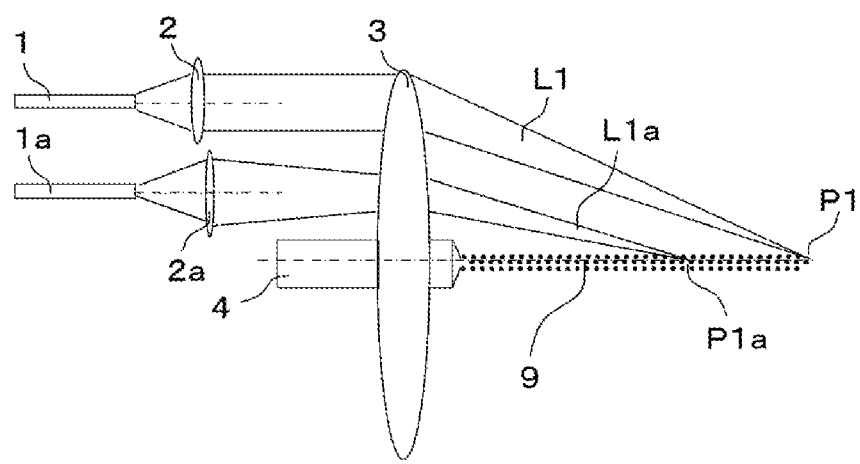
FIGS. 21A and 21B are a side view and a plan view illustrating another build-up welding example using the plurality of optical fibers in the embodiment.
Figure 21B:
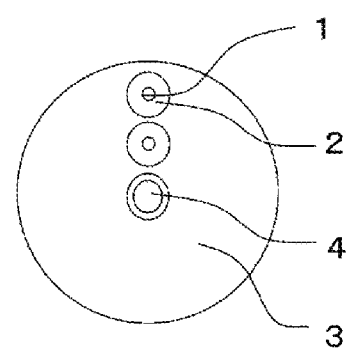
Figure 22A:
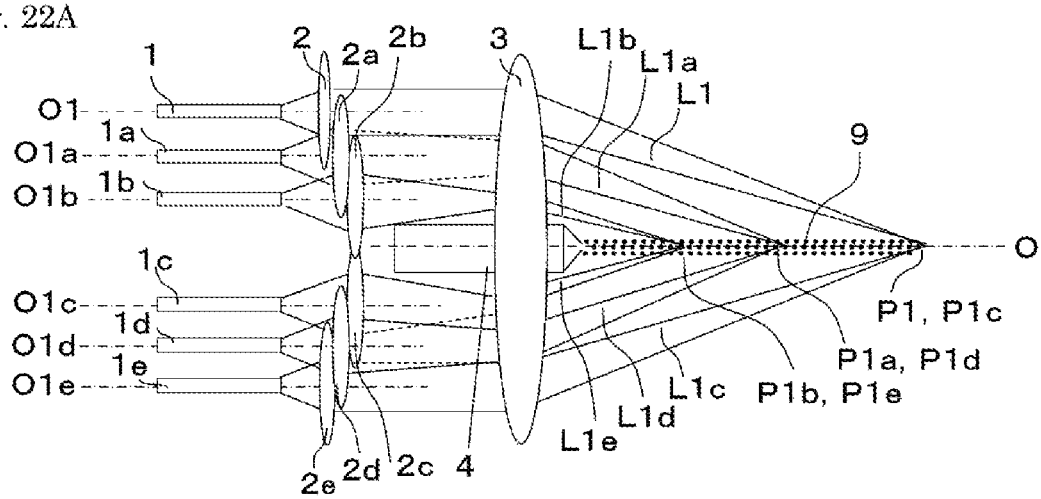
FIGS. 22A and 22B are a side view and a plan view illustrating another build-up welding example using the plurality of optical fibers in the embodiment.
Figure 22B:
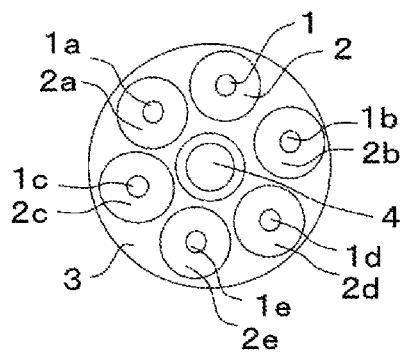

FIG. 20(a) is a side view illustrating a machining example in which two optical fibers 1 and two collimator lenses 2 are arranged linearly in the radial direction of the condenser lens 3 in this embodiment, and FIG. 20(b) is a plan view thereof. FIG. 21(a) is a side view illustrating an example in which one optical fiber 1 and one collimator lens 2 corresponding to that are arranged at different positions on the axis O1 of the collimator lens 2 in the arrangement configuration illustrated in FIG. 20. In FIG. 20(b) and FIG. 21(b), the arrangement configuration on the plane of the optical fiber 1, the optical fiber 1a, the collimator lens 1, and the collimator lens 1a is different from the arrangement configuration illustrated in FIG. 18(b) and FIG. 19(b), but in this case, too, similarly to the case illustrated in FIG. 11, since the distance from the optical fiber 1a to the collimator lens 2a is large, only the laser beam L1a projected from the optical fiber 1a is brought closer to the direction of the nozzle tip port direction of the supply nozzle (FIG. 20(a) and FIG. 21(a)). FIG. 22(a) is a side view of a case where six optical fibers 1 and six collimator lenses are arranged around the supply nozzle 4, and FIG. 22(b) is a plan view thereof.

The distance on the axis O1 from the optical fiber 1 to the collimator lens 2 is equal to the distance on an axis O1C from the optical fiber 1c to the collimator lens 2c, the distance on the axis O1a from the optical fiber 1a to the collimator lens 2a is equal to a distance on an axis O1d from an optical fiber 1d to a collimator lens 2d, and the distance on the axis O1b from the optical fiber 1b to the collimator lens 2b is equal to a distance on an axis O1e from the optical fiber 1e to a collimator lens 2e (FIG. 22(a)). In this case, too, similarly to the case illustrated in FIG. 11, when the relative distance from the optical fiber to the collimator lens is large, the condensing position of the laser beam projected from the optical fiber is brought close to the nozzle tip port direction of the supply nozzle and irradiated (see the condensing positions P1 to P1e in FIG. 22).

By means of this embodiment, while the optical fiber 1 and the collimator lens 2 are in the parallel arrangement with respect to the supply nozzle 4, that is, while the axes of the optical fiber 1 and the collimator lens 2 are in parallel with the axis O of the condenser lens 3, the laser beam L projected from the optical fiber 1 can be condensed on the axis O and the periphery thereof from the nozzle tip port to the welding spot (FIGS. 5 to 22). Moreover, by means of the arrangement configuration of the optical fiber 1, the collimator lens 2, and the supply nozzle 4, the laser beam L projected from the optical fiber 1 has the irradiation region changed on the axis O and the periphery thereof from the nozzle tip port to the welding spot (FIGS. 5 to 22). Therefore, even if the optical fiber 1 or the collimator lens 2 is not driven by the control member, the laser beam irradiation region on the axis O can be changed by selecting the optical fiber 1 and the collimator lens 2 to be used from the plurality of optical fibers 1 and the plurality of collimator lenses 2.

Third Embodiment

Figure 23A:
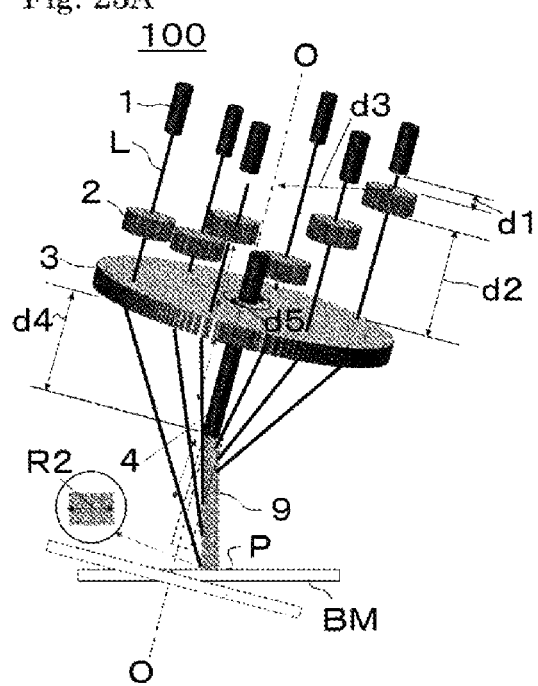
FIGS. 23A and 23B are perspective views illustrating a laser machining apparatus of a third embodiment to which the present invention is applied.
Figure 23B:
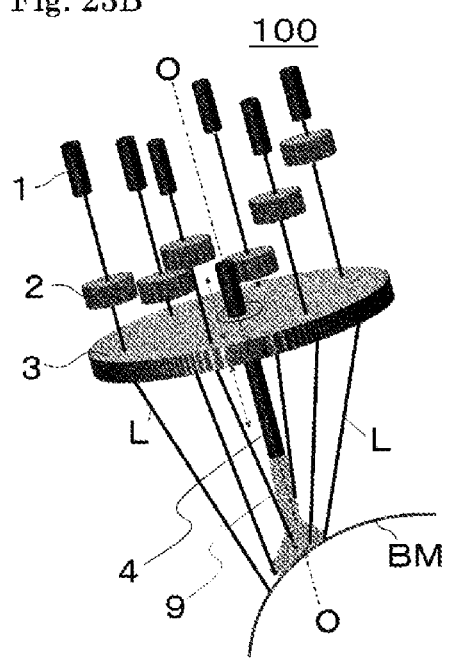

FIGS. 23(a) and 23(b) are perspective views illustrating the laser machining apparatus 100 which is a third embodiment of the present invention. FIGS. 24 to 27 are side views and plan views for explaining the control member 8 and the detachable member 7 of the laser machining apparatus 100 of this embodiment.

The laser machining apparatus 100 of this embodiment includes a plurality of the optical fibers 1, a plurality of the collimator lenses 2 through which the laser beams L from the plurality of optical fibers pass, respectively, a condenser lens 3 for condensing each of the laser beams L having passed through the plurality of collimator lenses 2, and a supply nozzle 4 for injecting/supplying a molten material 9. And the supply nozzle 4 is arranged so as to penetrate the condenser lens 3 or the supply nozzle 4 is arranged capable of driving control in a state penetrating the condenser lens 3, and the plurality of optical fibers 1 is arranged in parallel along the supply nozzle 4 (FIG. 23). The optical fiber 1 and the collimator lens 2 include a control member for driving control in parallel with the supply nozzle 4 or include a control member for driving control in a radial direction with respect to the condenser lens 3 (FIGS. 24 to 27).

Here, explaining using an example of the build-up on a roller cylindrical surface (FIG. 23(b)), when the laser beam L is advanced spirally while a roller is rotated, a moving direction of the laser beam L is constant and thus, a high temperature part is formed wide on a rear of the irradiation portion of the laser beam L by supplying the powder-state molten material 9 aiming to the rear of the laser beam irradiation portion, and processing can be executed highly efficiently and at a high speed. Moreover, even if a discharge direction of the molten material 9 is shifted depending on an inclination angle of the roller cylindrical surface BW, the optical axis of the laser beam L can be hit reliably and can be set so as to follow easily. Moreover, the molten material which has been melted can be supplied while the following front side or the rear side is irradiated in advance for warming.

Figure 32A:
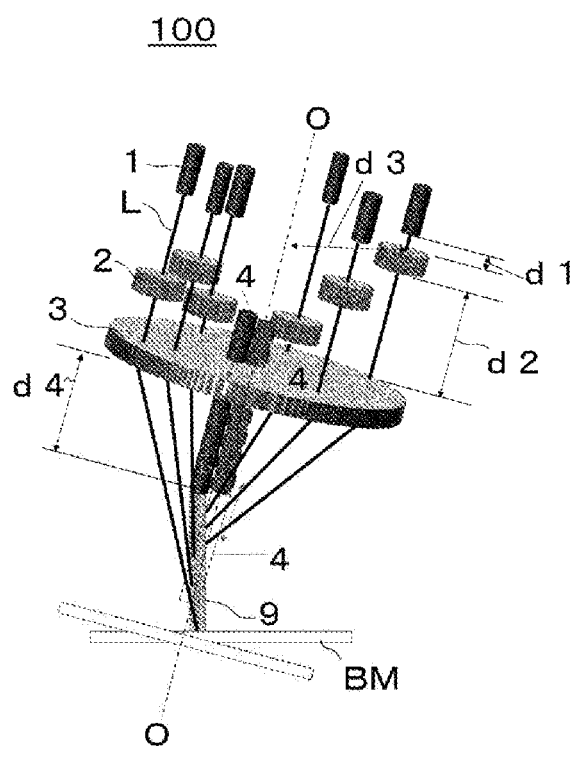
FIGS. 32A and 32B are perspective views for explaining another base material example in the embodiment.
Figure 32B:
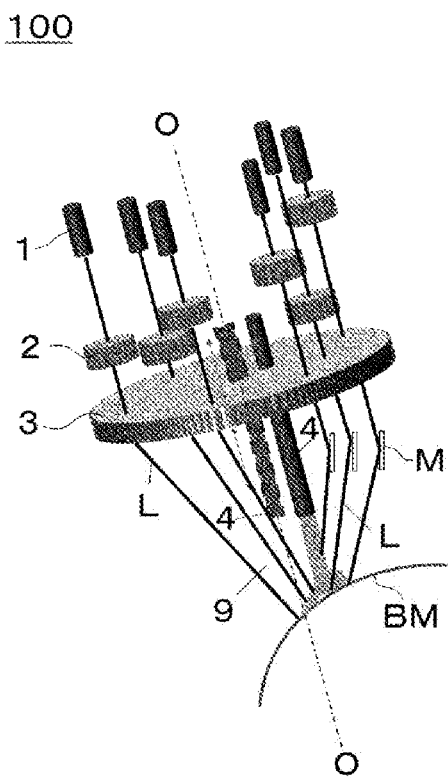

Moreover, FIGS. 32(a) and 32(b) are examples in which the supply nozzle 4 is arranged at a position shifted from the optical axis at the center of the condenser lens 3 and a case where the molten material 9 is injected from this supply nozzle 4 to the welding spot in an inclined state. As described above, the optical axis of the laser beam L from the optical fiber 1 disposed on the periphery of the supply nozzle 4 can be made to hit even the molten material 9 from the supply nozzle 4 at a position shifted from the center of the condenser lens 3 and can be set to follow or is irradiated in the periphery of these welding spots easily.

Figure 24A:
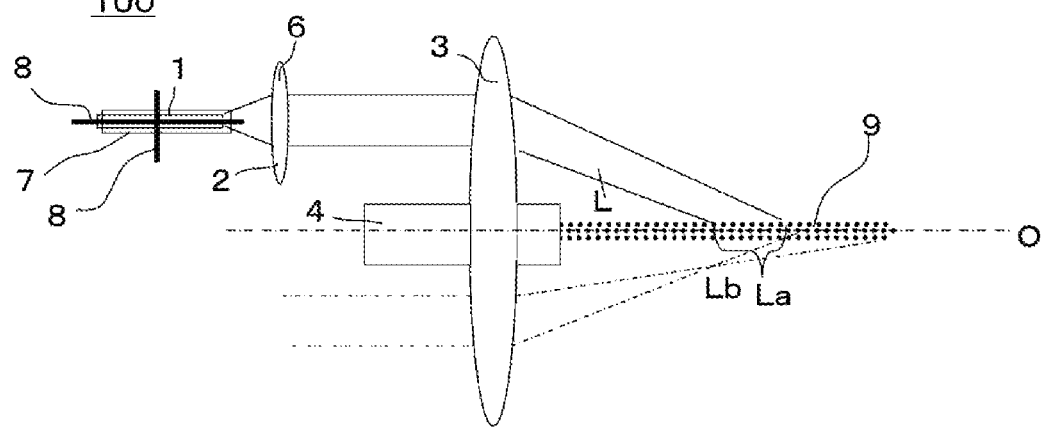
FIGS. 24A and 24B are a side view and a plan view illustrating a detachable member and a control member of the optical fiber in the embodiment.
Figure 24B:
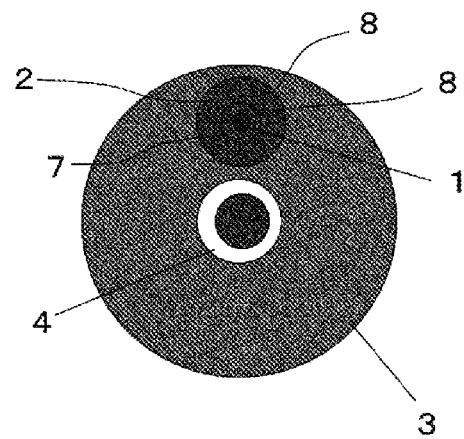

FIG. 24(a) is a side view illustrating the detachable member 7 and the control member 8 of the optical fiber 1 in this embodiment and FIG. 24(b) is a plan view thereof. The optical fiber 1 is attached to the detachable member 7, and the detachable member 7 is attached to the control member 8. The control member 8 includes a rail, a motor and the like and moves the optical fiber 1 in parallel with or in the perpendicular direction to the supply nozzle 4 by driving the detachable member 7. Therefore, the optical fiber 1 is driven/controlled in parallel with the supply nozzle 4 or in parallel with the condenser lens 3. In other words, it is configured capable of parallel movement or perpendicular movement with respect to the axis O of the condenser lens 3. The laser beam L is applied in a controlled manner on the axis O of the condenser lens 3 from the supply nozzle 4 to the welding spot (FIGS. 24(a) and 24(b)). FIG. 24(a) illustrates an example that the laser beam L of the optical fiber is applied with a predetermined width La to the molten material 9.

Figure 25A:
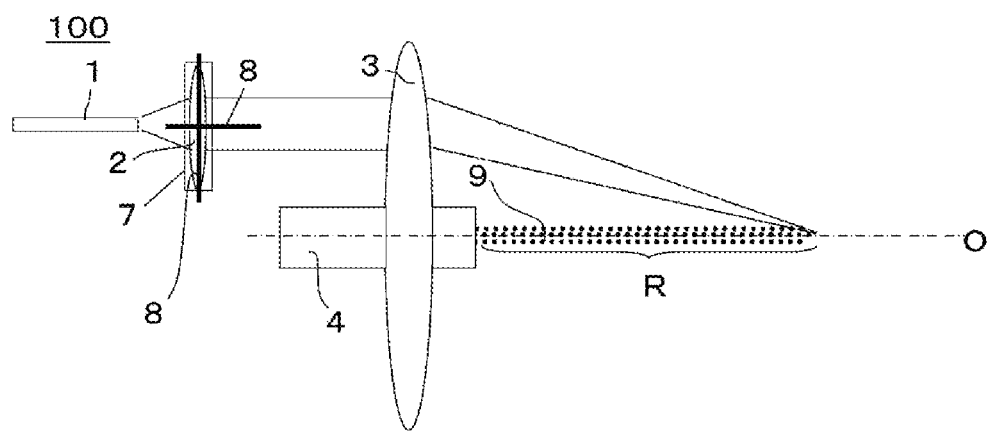
FIGS. 25A and 25B are a side view and a plan view illustrating the detachable member and the control member of the collimator lens in the embodiment.
Figure 25B:
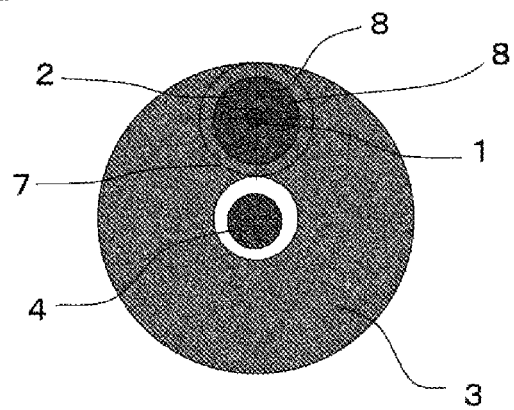

FIG. 25(a) is a side view illustrating the detachable member 7 and the control member 8 of the collimator lens in this embodiment, and FIG. 25(b) is a plan view thereof. The collimator lens 2 is attached to the detachable member 7, and the detachable member 7 is attached to the control member 8, whereby the collimator lens 2 is driven in parallel with or perpendicularly to the axis O of the condenser lens 3 by the control member 8. In other words, the control member 8 drives the collimator lens 2 in parallel with or perpendicularly to the supply nozzle 4. The laser beam L is applied in a controlled manner onto the axis O of the condenser lens 3 from the supply nozzle 4 to the welding spot (FIGS. 25(a) and 25(b)). Note that, in realizing reduction of the size and the weight of the apparatus, the collimator lens 2 is preferably configured to be driven/controlled by a detachable member 7B and a control member 8B so as to be contained in the radius of the condenser lens 3. For example, when the condenser lens 3 is to be accommodated in the housing, the collimator lens 2 is driven/controlled so as to be contained in the diameter of the condenser lens 3. When the housing is not used, the driving range of the collimator lens 2 is not limited and thus, the driving range of the collimator lens 2 is not necessarily contained in the diameter of the condenser lens 3.

The condenser lens 3 is disposed at a fixed position but may be detachable by the detachable member or may be controllable by the control member. Moreover, the single condenser lens 3 may be divided into a plurality of pieces (FIG. 6), and each of the divided condenser lenses 3a may be capable of condensation control or lens replacement by attaching the detachable member and the control member to each of them.

Figure 26A:
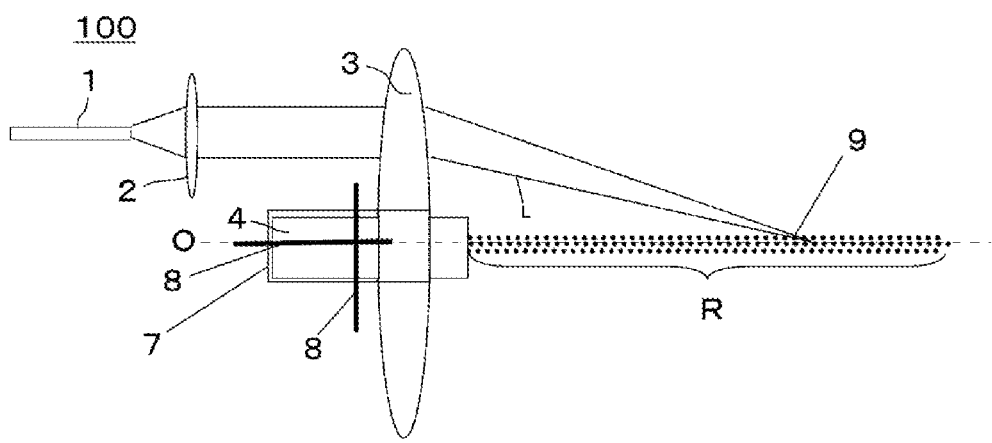
FIGS. 26A and 26B are a side view and a plan view illustrating the detachable member and the control member of the supply nozzle in the embodiment.
Figure 26B:
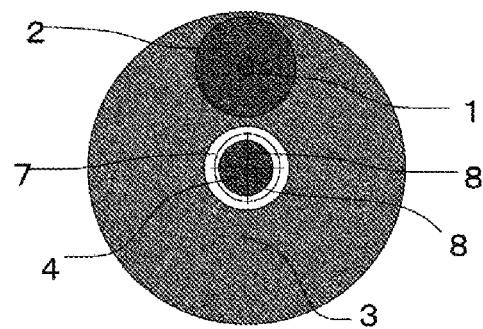

FIG. 26(a) is a side view illustrating the detachable member 7 and the control member 8 of the supply nozzle 4 in this embodiment, and FIG. 26(b) is a plan view thereof.

The supply nozzle 4 is attached to the detachable member, and the detachable member is attached to the control member so that a control member 8C is configured capable of parallel movement or perpendicular movement of the supply nozzle 4 with respect to the axis O of the condenser lens 3. That is, the supply nozzle 4 is moved perpendicularly or in parallel in the radial direction of the condenser lens 3 so as to pass through almost the center of the condenser lens 3. The molten material 9 is supplied from the supply nozzle 4 onto the axis O of the condenser lens 3 and to the periphery thereof from the supply nozzle 4 to the welding spot (FIG. 26).

As a specific control member of the optical fiber 1, the collimator lens 2, and the supply nozzle 4, a voice coil motor or a linear motor employed in an autofocus function of a camera or the like can be considered, for example. Moreover, as an attaching/detaching method of the optical fiber 1 and the collimator lens 2 as well as the supply nozzle 4, attachment/detachment and replacement can be carried out by storing them in a sliding type holder and by inserting/removing them. The optical fiber 1, the collimator lens 2, the condenser lens 3, and the supply nozzle 4 are driven/controlled by similar mechanisms and driven synchronously or individually.

Figure 27:
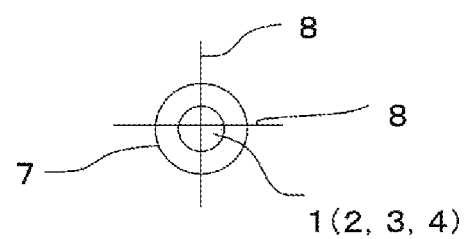
FIG. 27 is a plan view in which the optical fiber, the collimator lens, and the supply nozzle are arranged and configured to be driven/controlled in an X-Y direction by the control member in the embodiment.
Figure 28:
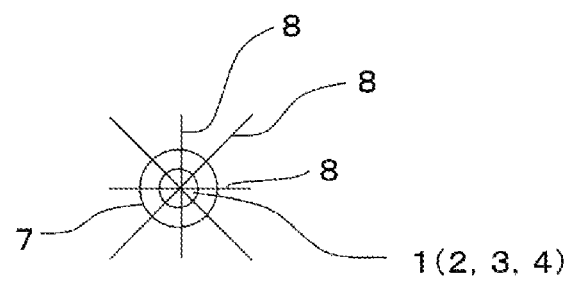
FIG. 28 is a plan view in which the optical fiber, the collimator lens, and the supply nozzle are arranged and configured to be driven/controlled in a radial direction by the control member in the embodiment.
Figure 29:
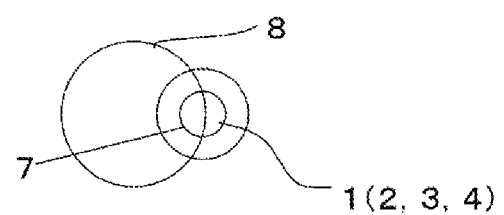
FIG. 29 is a plan view in which the optical fiber, the collimator lens, and the supply nozzle are arranged and configured to be driven/controlled in a circumferential direction by the control member in the embodiment.
Figure 30:
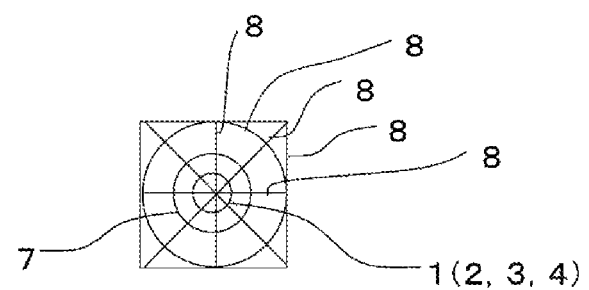
FIG. 30 is a plan view in which the optical fiber, the collimator lens, and the supply nozzle are arranged and configured to be driven/controlled in the X-Y direction, in the radial direction, and in the circumferential direction by the control member in the embodiment.

FIGS. 27 to 30 are plan views illustrating arrangement configuration examples of the optical fiber 1, the collimator lens 2, the condenser lens 3 or the supply nozzle 4 of this embodiment with respect to the control member and the detachable member. FIG. 27 is an arrangement example in which they are configured to be driven/controlled by the control member 8 and the detachable member 7 in the X-Y direction. FIG. 28 is an arrangement example in which they are configured to be driven/controlled radially. FIG. 29 is an arrangement example in which they are configured to be driven/controlled in a circumferential direction. FIG. 30 is an arrangement example in which they are driven/controlled freely in the X-Y direction, in the radial direction, and in the circumferential direction.

In this embodiment, since the optical fiber 1, the collimator lens 2, and the supply nozzle 4 are moved in parallel with the axis O of the condenser lens 3 (FIGS. 24 to 26), by employing the arrangement configuration illustrated in FIGS. 27 to 30, they move in upper, lower, right, and left directions, diagonally upper, lower, right, and left directions and a circumferential direction to a radial axis of the condenser lens. The control member 7 is a control portion of the laser machining apparatus and carries out synchronous driving or individual driving. FIG. 24(a) is an example in which defocusing as well as irradiation and melting of the molten material 9 are carried out. Moreover, the laser beam can be defocused in the spread after being focused once and then applied to the molten material 9 for melting (FIG. 24(a)).

The condensation control method by the third embodiment uses a property of the lenses illustrated in FIGS. 11 to 17 of the second embodiment, and by driving/controlling the optical fiber 1, the collimator lens 2, and the supply nozzle 4 by the control member to change the arrangement, the laser beam L projected from the optical fiber 1 is applied onto the axis O and to the periphery thereof from the nozzle tip port 4a to the welding spot.

In the condensation control on the center axis (axis), by making the relative distance between the optical fiber 1 and the collimator lens 2 larger by the control member 8, the condensing position P of the laser beam L can be brought closer to the nozzle tip port direction of the supply nozzle 4 (FIG. 11). By bringing the relative distance between the optical fiber 1 and the collimator lens 2 smaller by the control member 8, the condensing position P of the laser beam L is carried out by separating from the nozzle tip port direction of the supply nozzle 4 (FIG. 12). Therefore, the relative distance between the optical fiber 1 and the collimator lens 2 is changed by the parallel movement of the optical fiber 1 or the collimator lens 2 with respect to the axis O, and application of the laser beam L is controlled on a supply region R (on the axis O) of the material from the supply nozzle 4 to the welding spot while the optical fiber 1 and the collimator lens 2 are in the parallel arrangement with respect to the supply nozzle 4.

Regarding the control of the condensing angle of the laser beam L, the condensing angle θL1 of the laser beam L1 is adjusted by controlling the relative distance from the optical fiber 1 and the axis O1 of the collimator lens 2 to the axis O of the condenser lens 3 by synchronously driving the optical fiber 1 and the control member 8 of the collimator lens 2 (FIG. 13). Note that, if the condensing angle is not adjusted, the optical fiber 1 and the collimator lens 2 are arranged in parallel with the powder supply nozzle 4 and are moved only in parallel and thus, however the optical fiber 1 or the collimator lens 2 is driven, it does not become larger than the diameter of the condenser lens 3.

The control of the condensing diameter of the laser beam L is carried out by providing the detachable member 7 on the collimator lens 2 and by replacing the collimator lens 2 with a lens with a different focal distance (FIG. 14).

In the case of the laser beam irradiation control with a different wavelength, it is carried out by the detachable member 7 which is a mechanism for attaching/detaching the optical fiber 1 (FIG. 15).

When the supply nozzle 4 includes the control member, it is configured to penetrate almost the center of the condenser lens 3 by the control member 7 and is moved perpendicularly to the condenser lens 3 so that the distance from the nozzle tip port 4a of the supply nozzle 4 to the base material BM is made smaller, and the molten material injection can be brought closer to the irradiation region of the laser beam without changing the condensing angle of the laser beam, and the molten material 9 can be melted stably according to the characteristics of the molten material 9. The build-up welding can be carried out while the molten material injection region is narrowed or widened (FIG. 16). Moreover, the condensing position can be adjusted to a position close to the condenser lens 3 by moving the supply nozzle 4 in a direction of a rear end of the housing by the control member 7 to change the condensing angle of the laser beam. Moreover, since it can be contained inside the housing 6, the sizes of the housing and the laser machining apparatus can be reduced (not shown).

The axis C of the supply nozzle 4 is shifted from the axis O (center axis of the laser machining apparatus) of the condenser lens 3 by moving the supply nozzle 4 in parallel with the diameter direction of the condenser lens 3 by the control member 7 to arrange the axis O of the condenser lens 3 and the axis C of the supply nozzle 4 in arrangement shifting manner, and when the supply nozzle 4 is arranged at a position opposite to the advancing direction D of the laser machining apparatus 100 and the molten material 9 is injected, the position directly under the laser beam U and the molten material input position G are shifted from each other and thus, more efficient molten material input becomes possible by inputting the molten material closer to the rear than the laser beam irradiation region with respect to the welding advancing direction, and the laser machining process in a short time becomes possible (FIG. 17).

Attaching the detachable member 7 to the supply nozzle 4 enables proper use of the supply nozzle 4 according to the type of the molten material 9. Moreover, attaching the detachable member to each facilitates replacement at the failure in the optical fiber 1, the collimator lens 2, and the supply nozzle 4.

The molten material 9 injected from the supply nozzle 4 is capable of laser beam irradiation freely on the axis O from the injection port of the supply nozzle 4 to the base material surface by driving of each of the optical fiber 1, the collimator lens 2, and the supply nozzle 4 and thus, the molten material 9 can be melted directly or can be supplied to the base material surface in a molten state.

FIG. 23 is a perspective view of the laser machining apparatus 100 in this embodiment and is a view for explaining that when the laser machining process is carried out by using a plurality of the optical fibers 1 and a plurality of the collimator lenses 2, diversified laser machining can be realized by driving adjustment of the plurality of the optical fibers 1, the plurality of collimator lenses 2, and the supply nozzle 4 independently or in synchronization.

By changing a distance d1 from an ejection port of the optical fiber 1 to the collimator lens 2 or by changing a distance d2 from the collimator lens 2 to the condenser lens 3, the irradiation control is executed on the axis O from the injection port of the supply nozzle 4 to the welding spot or in the vicinity thereof independently of the other laser beam irradiation. As a result, the irradiation according to the number of the optical fibers 1 or the number of the collimator lenses 2 becomes possible in the region R from the condenser lens to the welding spot P on the base material surface (FIGS. 11, 12, and 23).

Moreover, by synchronously driving the optical fiber 1 and the collimator lens 2 to change a distance d3 from the optical fiber 1 or the collimator lens 2 to the supply nozzle 4, the condensing angle is controlled according to the number of the optical fibers 1 or the number of the collimator lenses 2 (FIGS. 13 and 23).

Moreover, by providing the detachable member on each of the collimator lenses 2 to replace the collimator lens 2 to the one with a different focal distance, the condensing diameter is controlled according to the number of the optical fibers 1 and the number of the collimator lenses 2 (FIG. 14), and by replacing each of the optical fibers 1 by the detachable member, the laser beams with different wavelengths in number according to the number of the optical fibers is projected (FIG. 15). Since this laser machining apparatus 100 includes a plurality of the optical fibers 1 and a plurality of the collimator lenses 2, the adjustment of the condensing diameter or the laser beam irradiation with a different wavelength can be carried out without attachment/detachment and replacement during the laser machining process if the numbers are within the ranges (FIG. 23).

Moreover, since the supply nozzle 4 includes the control member 7C, when the molten material input position adjustment is made during the laser machining process (FIG. 16) and the plurality of optical fibers 1 and the plurality of collimator lenses 2 are used, the injection position R2 of the molten material 9 can be changed by changing a position (movable region) d5 of the supply nozzle 4 illustrated in FIG. 23.

Furthermore, since the plurality of optical fibers 1 and the plurality of collimator lenses 2 are provided, the laser beam L used for the irradiation can be instantaneously changed so as to change the irradiation amount or the irradiation range can be changed without replacing the optical fiber 1. Moreover, by changing the laser beam L to be used, the region R from the position directly under the laser beam to the input position of the molten material 9 can be changed instantaneously without driving the supply nozzle by the control member.

In this embodiment, pluralities of the optical fibers 1 and the collimator lenses 2 can be mounted as long as the numbers are contained in the range of the condenser lens 3, and a plurality of points between an injection opening portion of the supply nozzle 4 and the welding spot on the base material surface can be irradiated still in the parallel arrangement (FIG. 23).

Therefore, any one of the following can be performed without increasing a size of the apparatus larger than the diameter of the condenser lens 3: 1. when each of the irradiation points is moved over time by adjusting the positions of the plurality of collimator lenses 2; 2. when the irradiation angle of each is changed over time by moving the collimator lens 2 and the optical fiber 1 in synchronization; 3. when the wavelength of the laser beam is to be changed by changing the optical fiber 1; 4. when the condensing diameter is adjusted by changing to the collimator lens 2 with a different focal distance; and 5. when the number of the optical fibers 1 or the collimator lenses 2 is increased.

In this embodiment, the collimator lens 1 and the condenser lens 3 are illustrated as having a perfect circle, but they do not have to have a perfect circular shape as long as the laser beam from the optical fiber 1 can be condensed. It can be changed to various shapes such as a triangle, a trapezoid, a fan-shape, a diamond shape and the like as appropriate. For example, if the condenser lens 3 and the housing 6 are shaped into a Reuleau polygonal shape, it becomes possible to control a cable of the optical fiber 1 variably, and thus the laser machining apparatus can enter into a corner of a fine cubic structure and apply machining process. When the condenser lens having a perfect circular shape is used, by shaping the condenser lens so as to encompass as many optical fibers 1 and collimator lens 2 as possible without a gap in the perfect circle, reduction of a size, a weight, and a cost can be realized. Its shape is preferably changed as appropriate according to a shape and a design of a constituent element of the laser machining apparatus 100.

Conventionally, there has been a laser machining apparatus in which an optical path of the laser beam is changed by using a polarization element such as a prism other than the method of collecting the laser beam to a focal point by using a condenser lens such as a collimator lens and a condenser lens, but when the prism is used, since the prism has only a function of refracting the light in one direction, a lens is needed for light condensing. Therefore, if the prism is used, the prism itself and an attaching member for fixing the prism are also needed separately, and the number of excess components is increased as compared with the case where only the collimator lens and the condenser lens are used. If a polarization element is used as above, a plurality of polarization elements corresponding to the number of the optical fibers is needed and since various attaching members according to the number of the plurality of polarization elements are needed to be attached to the laser powder build-up apparatus, a size and a weight of the apparatus are increased. Moreover, since the laser beam is distorted upon passing through the prism, its light condensing performance is deteriorated. Therefore, use of only the lens as the condensing apparatus is desirable from a viewpoint of a size of the laser machining apparatus and also from a viewpoint of the light condensing performance. However, since the supply nozzle in the present invention is arranged so as to penetrate the condenser lens, there is a need to drill a hole in the single condenser lens or to divided and arrange the single condenser lens. In order to avoid such a situation, the prism, the collimator lens, and the condenser lens can be used at the same time.

As described above, by employing such configuration in this example, the supply nozzle 4 passes through a center part of the condenser lens 3 as illustrated in FIG. 23 and the plurality of optical fibers 1 can irradiate the molten material 9 or the base material BM still in the parallel arrangement with respect to the supply nozzle 4. While the laser machining apparatus 100 is operated and various types of control is executed, the plurality of optical fibers 1, the plurality of collimator lenses 2, and the supply nozzle 4 are controlled so as not to spread larger than the diameter of the condenser lens 3. Therefore, the sectional area of the housing used for the laser machining build-up apparatus can be equal to the diameter of the condenser lens 3.

Conventionally, there has been a laser powder build-up apparatus for condensing the laser beam by using the collimator lens and the condenser lens, but the number of the condenser lenses for condensing the laser beam is not one but the number according to the number of the collimator lenses was needed. Moreover, in the conventional apparatus, various attaching members according to the number of the condenser lenses needed to be attached to the laser powder build-up apparatus.

By means of the invention of the present application, size reduction of the apparatus can be made as compared with an apparatus which has been conventionally present and in which a laser heating apparatus and a supply nozzle are not integrated, an apparatus in which the supply nozzle is disposed on a side surface of the laser heating apparatus, and an apparatus in which the plurality of the optical fibers are not arranged in parallel with the supply nozzle. Moreover, since only one condenser lens 3 and the various attaching members according to that are needed as compared with the conventional laser powder build-up apparatus, the size, the weight, and the cost of the apparatus can be reduced.

Figure 31A:
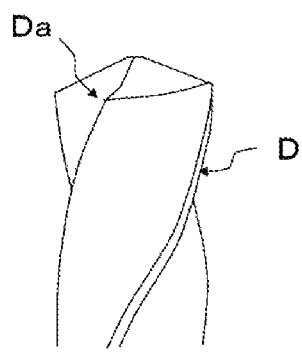
FIGS. 31A, 31B, 31C and 31D are perspective view for explaining a base material example in the embodiment.
Figure 31B:
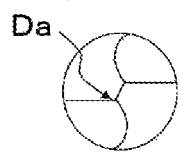
Figure 31C:
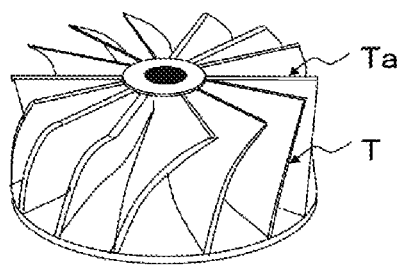
Figure 31D:
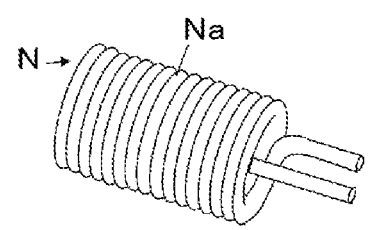

As objects to be applied the laser machining apparatus 100 of this embodiment, the apparatus is used in a case of the powder build-up welding of a cutting edge Da of a drill D (FIGS. 31(a)(b)) and a case of the powder build-up welding of a cutting edge Ta of a turbine blade T (FIG. 31(c)). FIG. 31(c) is a schematic diagram of a heat exchanger N in the case where the laser powder build-up welding is performed, taking the heat exchanger N as the base material. In the case of the heat exchanger N with irregularity on an outer periphery, a different material such as copper needs to be build-up welded to the base material surface such as stainless, but in this case, a temperature of the laser beam L for heating/melting the molten material 9 and a temperature of the laser beam for heating the base material BM need to be different. That is because, if the base material is heated at a temperature for heating/melting the molten material, deformation or discoloration can occur in the base material and thus, the heating temperature of the base material needs to be adjusted to a suitable temperature lowered from the heating temperature of the molten material. The laser machining apparatus 100 of the present invention is capable of adjusting each of the heating temperatures by independently adjusting wavelengths, outputs, and condensing diameters of the laser beam L for heating/melting the molten material 9 and the laser beam L for heating/melting the base material.

The material of the molten material is not limited to copper but can include many material such as a material with strong reflection, a material having a high melting point and the like, for example. When the molten material made of such material is to be build-up welded, the laser irradiation different from that for the base material is important similarly to the case of copper, but in the present invention, the condensing diameter and the irradiation energy amount of the laser beam can be changed, and the injection amount, the injection speed, and the injection range of the molting material can be changed and thus, rapid build-up machining can be realized. Note that in the case of this example, the axis O from the nozzle tip port 4*a* of the supply nozzle 4 to the welding spot can be subjected to different laser irradiation according to the number of the optical fibers. Moreover, each of the laser beams L can be subjected to laser beam irradiation control by the detachable member or the control member.

Fourth Embodiment

Figure 33:
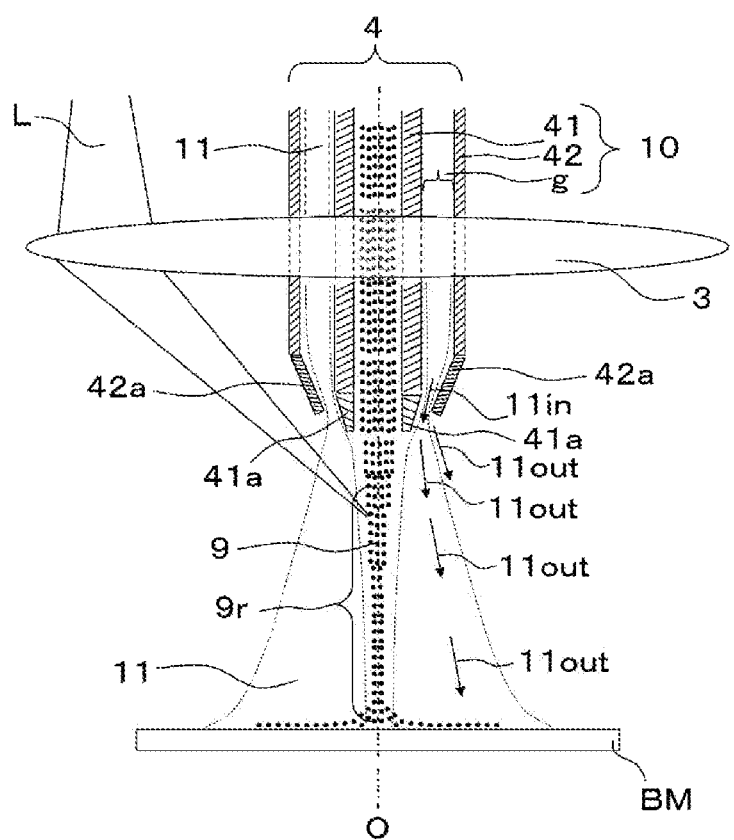
FIG. 33 is an enlarged view of an essential part of a laser machining apparatus of a fourth embodiment to which the present invention is applied.

FIG. 33 is a sectional view illustrating the laser machining apparatus 100 which is a fourth embodiment of the present invention.

Figure 34:
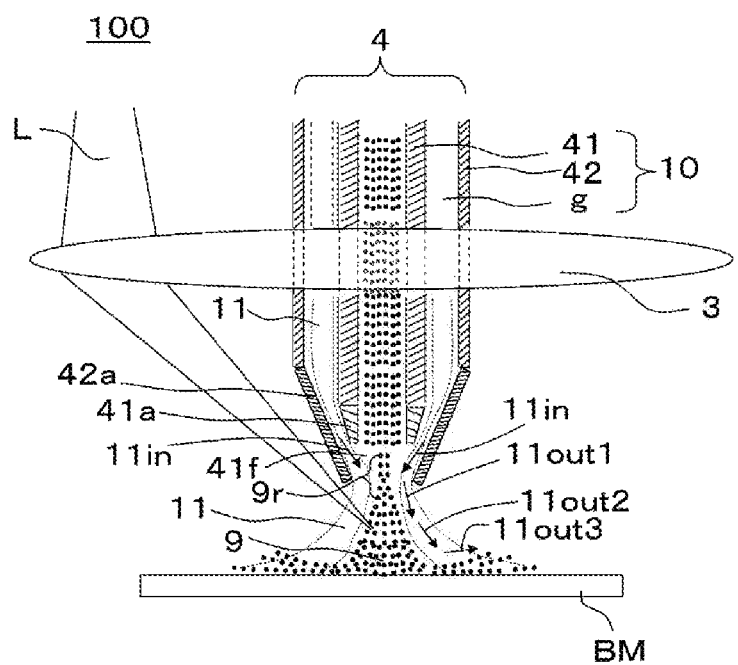
FIG. 34 is an enlarged view of an essential part illustrating a case where an inner pipe nozzle tip port is disposed closer to an inside than an outer pipe nozzle tip port in the embodiment.

FIG. 33 is an enlarged view of an essential part illustrating a case where a double supply nozzle similarly to FIG. 7(*a*) is arranged (projects, protrudes) outwardly from (ahead of) a nozzle tip port (outer pipe nozzle tip port) 42*a* of an outer pipe nozzle 42. FIG. 34 is an enlarged view of an essential part illustrating a case where, to the contrary to FIG. 33, the inner pipe nozzle tip port 41*a* is arranged (projects, protrudes) inwardly from the outer pipe nozzle tip port 42*a*.

FIG. 7(*a*) illustrates in brief an example of the double supply nozzle in which the supply nozzle 4 comprises the converging gas supply means 10 in the periphery thereof, whereas in this embodiment, an example of the double supply nozzle optimized for a case of irradiation of the laser beam L from the side onto the axis O of the condenser lens 3 and its vicinity as the laser machining apparatus 100 of the present invention is illustrated. In this embodiment, the supply nozzle 4 is composed of an inner pipe nozzle 41 for supplying the molten material 9 and an outer pipe nozzle 42 disposed on the outer periphery of the inner pipe nozzle 41. That is, a space between the inner pipe nozzle 41 and the outer pipe nozzle 42 is a channel g for the converging gas (shielding gas) 11, and the converging gas (shielding gas) supply means 10 is composed of the inner pipe nozzle 41, the outer pipe nozzle 42, and the channel g (FIG. 33).

The nozzle tip port (inner pipe nozzle tip port) 41*a* of the inner pipe nozzle 41 is arranged (projects, protrudes) outwardly from (ahead of) the nozzle tip port (outer pipe nozzle tip port) 42*a* of the outer pipe nozzle 42 (FIG. 33). In the present invention, since the laser beam L is capable of irradiating the axis O of the condenser lens 3 from the injection port of the supply nozzle 4 to the welding spot and the vicinity thereof, the molten material 9 to be injected is also preferably supplied stably with an equal amount and an equal pressure onto the axis O of the condenser lens 3 from the injection port of the supply nozzle 4 to the welding spot and the vicinity thereof. As illustrated in FIG. 33, since the inner pipe nozzle tip port 41*a* is arranged (projects, protrudes) outwardly from the outer pipe nozzle tip port 42*a*, the converging gas 11 can spread in an outward direction 11out (direction away from the axis O) easily as compared with the case where the inner pipe nozzle tip port 41*a* is disposed inwardly from the outer pipe nozzle tip port 42*a* (FIG. 34). Thus, the molten material 9 is not excessively converged to the vicinity of the inner pipe nozzle tip port 41*a* so that it is injected as a thin and long straight line. Therefore, since a converged region 9*r* of the molten material spreads as a thin and long straight line on the axis O of the condenser lens from the injection port of the supply nozzle 4 to the welding spot and the vicinity thereof, the laser beam L can be applied more easily, and the irradiation with the laser beam L can be carried out easily even on the axis O separated from the inner pipe nozzle tip port 41*a* by some distance (FIG. 33).

FIG. 34 is an enlarged view of an essential part illustrating the case where, to the contrary to FIG. 33, the inner pipe nozzle tip port 41*a* is arranged (projects, protrudes) inwardly from the outer pipe nozzle tip port 42*a*, and this is a comparative example to FIG. 33. The inner pipe nozzle tip port 41*a* and the outer pipe nozzle tip port 42*a* form an internal space 41*f* ahead of the inner pipe nozzle tip port 41*a*. When the inner pipe nozzle tip port 41*a* is disposed inwardly from the outer pipe nozzle tip port 42*a* as in FIG. 34, the outer pipe nozzle tip port 42*a* suppresses the injection of the converging gas 11 in the outward direction 11out (laterally, in the direction away from the axis O), and the converging gas 11 is not likely to spread in the outward direction. The converging gas 11 is injected in an inward direction 11in (direction toward the axis O) in the internal space 41*f*, and the injection flows in the inward direction 11in collide with each other so that the powdery molten material 9 can be diffused more easily. The converged region 9*r* of the jet flow of the converging gas 11 in FIG. 34 is contained in a short region in the vicinity of the inner pipe nozzle tip port 41*a* and the outer pipe nozzle tip port 42*a*. As compared with FIG. 33, the jet flow is converged closer to the injection port of the supply nozzle 4, the converged region is shorter, and the powdery molten material 9 is more likely to be diffused to all possible directions, so that the build-up welding is carried out with a shorter distance between the injection port of the supply nozzle 4 (the vicinities of the inner pipe nozzle tip port 41*a* and the outer pipe nozzle tip port 42*a*) and the base material BM. The proximity to the base material BM generates an opposing jet flow, which diffuses the powdery molten material 9 more strongly to all the possible directions. For taking an advantage of the laser machining apparatus 100 of the present invention that the laser beam L can be applied onto the axis of the condenser lens from the injection port of the supply nozzle 4 to the welding spot and the vicinity thereof, the inner pipe nozzle tip port 41*a* is preferably arranged (projects, protrudes) outwardly from (ahead of) the outer pipe nozzle tip port 42*a* as in FIG. 33 in which the converged region 9*r* of the molten material spreads as a thin and long straight line.

Figure 35A:
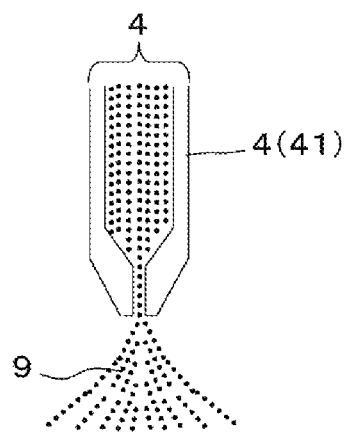
FIGS. 35A and 35B are sectional view illustrating a state of a jet flow of the molten material injected from the supply nozzle.
Figure 35B:
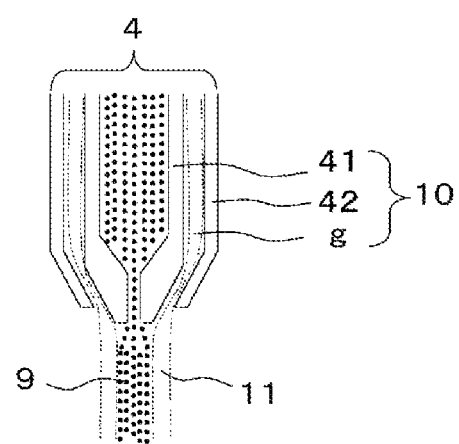

Moreover, in the supply nozzle 4 in the example illustrated in FIG. 33, the inner pipe nozzle 41 comprises the supply nozzle injection control means (not shown) for controlling the injection amount, the injection speed, and the injection range of the molten material 9. Moreover, in the supply nozzle 4 of this example, the converging gas supply means 10 composed of the inner pipe nozzle 41, the outer pipe nozzle 42, and the channel 9 comprises the converging gas injection control means (not shown) for controlling the injection amount, the injection speed, and the injection range of the converging gas 11. FIG. 35(*a*) is a view illustrating a state of the jet flow of the molten material 9 injected from a single supply nozzle. FIG. 35(*b*) is a view illustrating a state of the jet flow of the molten material 9 injected from a double supply nozzle. As illustrated in FIG. 35(*a*), the ordinary supply nozzle 4 (the single nozzle or the nozzle having only the inner pipe nozzle 41) comprising no converging gas supply means 10 diffuses the jet flow of the molten material 9, while the supply nozzle 4 (the double nozzle or the nozzle including the inner pipe nozzle 41 and the outer pipe nozzle 42) comprising the converging gas supply means 10 can converge the jet flow in which the molten material from the inner pipe nozzle 41 is mixed by the converging gas 9 (gas flow) from the converging gas supply means 10.

Figure 36A:
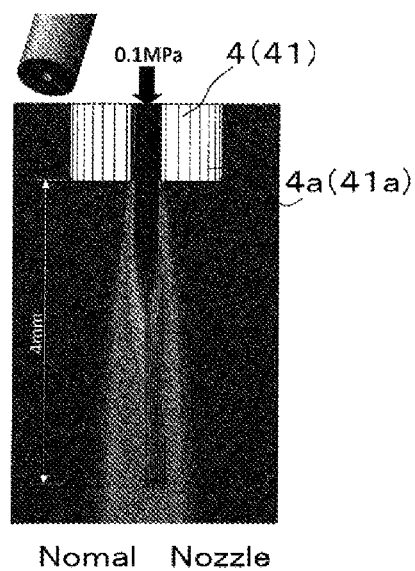
FIGS. 36A and 36b are simulation analysis diagrams of a jet-flow converging effect by a double nozzle.
Figure 36B:
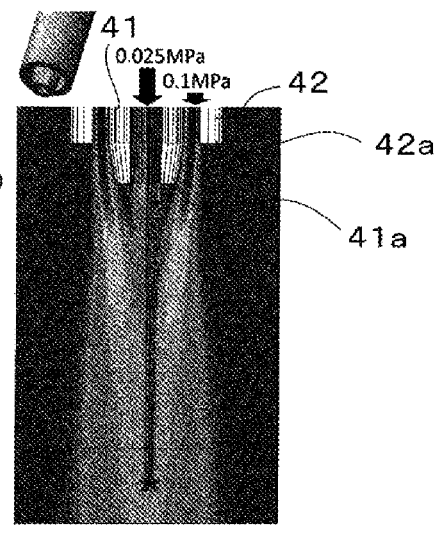
Figure 37A:
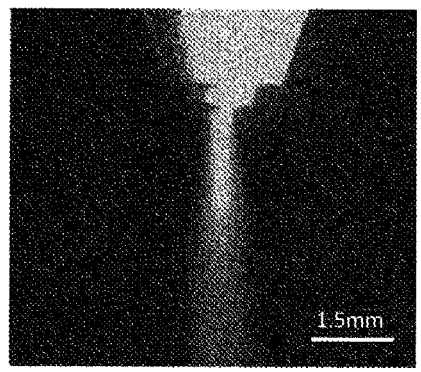
FIGS. 37A and 37B are experiment verification photos of the jet-flow converting effect by the double nozzle.
Figure 37B:
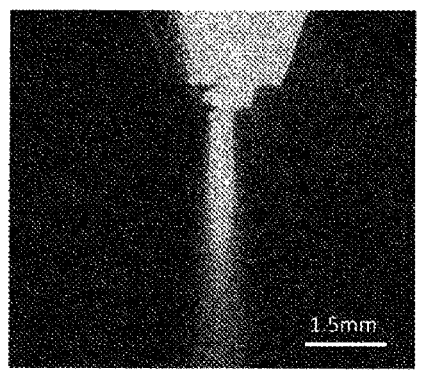
Figure 38:
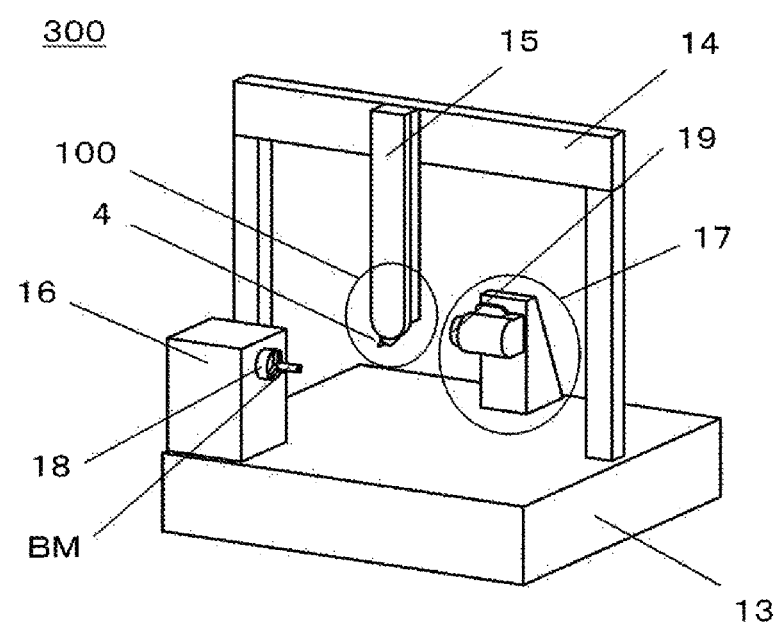

FIG. 36 are simulation analysis diagrams verifying a jet-flow converging effect of the double nozzle using simulation analysis. FIG. 37 are verification photos verifying the jet-flow converging effect of the double nozzle in experiments. FIG. 36(*a*) shows an ordinary supply nozzle 4 (the single nozzle or the nozzle including only the inner pipe nozzle 41) comprising no converging gas supply means 10 and illustrates the injection pressure of the molten material 9 injected from the supply nozzle 4. FIG. 37(*a*) is an experimental verification photo of the same nozzle as that in FIG. 36(*a*). FIG. 36(*b*) shows the supply nozzle 4 (the double nozzle or the nozzle consisting of the inner pipe nozzle 41 and the outer pipe nozzle 42) comprising the converging gas supply means 10, and illustrates the injection pressure of the molten material 9 injected from the supply nozzle 4. FIG. 37(*b*) is an experimental verification photo of the same nozzle as that in FIG. 36(*b*).

In FIG. 36(*a*), the molten material 9 is not converged but is diffused, and the injection pressure rapidly decreases on the axis at 4 mm from the tip port 4*a* of the supply nozzle 4. This is also apparent from the experimental verification photo of the jet-flow converging effect using the same nozzle (FIG. 37(*a*)). On the other hand, in FIG. 36(*b*), the molten material 9 injected from the inner pipe nozzle 41 is converged by the converging gas supply means 10, and the injection flow of the converging gas assists a flow velocity of the injection flow of the molten material 9, so that a region (core length) with a high injection pressure is maintained. In the experimental verification photo of the jet-flow converging effect using the same nozzle, too, it can be confirmed that the region (core length) with the high injection pressure is maintained (FIG. 37(*b*)). That is, in FIG. 36(*b*) and in FIG. 37(*b*), the injection pressure is rarely changed on the axis at 4 mm from the tip port 4*a* of the supply nozzle 4, and a region suitable for applying the laser beam L is maintained long.

By making the injection pressure of the converging gas 11 of the converging gas injection control means higher than the injection pressure of the molten material 9 by the supply nozzle injection control means, an effect (jet-flow converging effect) of converging the jet flow of the molten material 9 can be obtained (FIG. 36(*b*)). A ratio between an injection pressure $\alpha$ of the molten material 9 by the supply nozzle injection control means and an injection pressure $\beta$ of the converging gas 11 of the converging gas injection control means is preferably the injection pressure $\alpha$ of the molten material 9: injection pressure $\beta$ of the converging gas=1:3 to 1:4, and the injection pressure $\alpha$ of the molten material 9 is preferably as low as possible (FIG. 36(*b*)). That is because, if the injection pressure $\alpha$ is low, a supply amount of the molten material 9 per unit time decreases so that a cost can be reduced, and if the injection pressure $\alpha$ is high, the converging effect of the molten material 9 is weakened. In the case of the double nozzle, the distance from the inner pipe nozzle tip port 41*a* to the condensing position of the laser beam L is preferably adjustable. Moreover, a mechanism for adjusting relative positions of the inner pipe nozzle 41 and the outer pipe nozzle 42 and moving either one of them in parallel is preferably comprised so as to adjust the condensing position of the injection flow.

As a material of the supply nozzle 4, a light transmissive material which transmits the laser beam L may be also used in addition to a general metal material. As the laser-beam transmissive material, glass and plastic can be considered, and a material used for the condenser lens or the collimator lens may be also used. As the glass, borosilicate glass, quartz glass, soda glass, lead glass and the like can be considered, and an optical material subjected to heat-resistance treatment or reinforcing treatment is preferable. When the same material as the glass material for lens is to be used, it can be classified into crown glass and flint glass based on a difference in characteristics of wavelength distribution (Abbe number), but either one of them may be used, and as a type of the crown-glass based borosilicate glass, for example, BK7 having been made a common name and conventionally used for a lens and a prism can be considered. The quartz glass may be natural quartz glass, or may be optical glass of synthetic quartz manufactured only from pure silicon dioxide and not containing other components, synthetic quartz for excimer laser, anhydrous synthetic quartz and the like may be also used. As plastic, those having transparency and refractive index equal to those of the glass are used, and ADC (allyl diglycol carbonate) can be considered, for example.

By using the light transmissive material which transmits the laser beam L as the material of the supply nozzle 4, the vicinity of the nozzle tip port 41*a* (or 42*a*) of the supply nozzle 4 can be irradiated with the laser beam L. When the laser beam L is applied from the side to the axis O of the condenser lens 3 and its vicinity as in the laser machining apparatus 100 of the present invention, the nozzle tip port may block the laser beam L. Therefore, the laser beam L is applied on the axis O away from the nozzle tip port by some distance and its vicinity and thus, the vicinity of the nozzle tip port 41*a* (or 42*a*) cannot be irradiated easily (FIGS. 33 and 34). By using the light transmissive material as the material of the supply nozzle 4, the laser beam L is transmitted through the supply nozzle 4 or the nozzle tip port 41*a* (42*a*) even if the laser beam L is applied from the side of the axis O, and thus, the vicinity of the nozzle tip port 41*a* (or 42*a*) can be irradiated with the laser beam L. FIG. 33 illustrates that the inner pipe nozzle tip port 41*a* is disposed outwardly from the outer pipe nozzle tip port 42*a* so that the converged region 9*r* (or the core length) is encompassed on the axis O appropriately away from the nozzle tip port. This arrangement has an advantage that the converged region 9*r* is widened as compared with the case where the inner pipe nozzle tip port 41*a* is disposed inwardly from the outer pipe nozzle tip port 42*a* (FIG. 34), but a converging degree of the molten material 9 in the vicinity of the nozzle tip port 41*a* (42*a*) is lowered. Therefore, when the vicinity of the nozzle tip port 41*a* (or 42*a*) is irradiated with the laser beam L by using the light transmissive material which transmits the laser beam L as the material of the supply nozzle 4, a mechanism for adjusting relative position of the inner pipe nozzle 41 and the outer pipe nozzle 42 and moving either one of them in parallel is preferably comprised so as to arranging the inner pipe nozzle tip port 41*a* inwardly from the outer pipe nozzle tip port 42*a* as in FIG. 34 to adjust the condensing position of the injection flow to the vicinity of the nozzle tip port 41*a* (or 42*a*) (FIG. 34).

Although the embodiments have been described with reference to various examples, it can be expected for the laser machining apparatus 100 of the present invention to accelerate the adjustment function by automation. A programmed operation can be realized by combining a robot and the like, and automatic build-up welding can be carried out under optimal conditions for any shape or spot. The present invention can realize reduction of the weight and size of the laser machining apparatus 100, which is important in such automatic control by the robot.

REFERENCE NUMERALS 1 optical fiber
2 collimator lens
3 condenser lens
3a divided condenser lens
3b center
4 supply nozzle
4a tip port
d5 movable region
7 detachable member
8 control member
9 molten material
9r converged region
10 converging gas supply means
11 converging gas (shielding gas)
g channel
13 base
14 frame
15 arm
16 base material holding device
17 cutting device
18 base material holding means
19 tool holding means
41 inner pipe nozzle
41a inner pipe nozzle tip port
42 outer pipe nozzle
42a outer pipe nozzle tip port
100 laser machining apparatus
L laser beam
101 multi-axis articulated robot
101a laser machining head portion
102 laser oscillating device
103 molten material supply device
104 machining table
200 three-dimensional laser machining system
300 combined working machine
R supply region of molten material (distance between nozzle tip port and welding spot)
BM object to be welded (welding spot, base material to be build-up welded)
O axis from nozzle tip port toward welding spot

The invention claimed is:

1. A laser machining method comprising:
preparing a plurality of optical fibers; a plurality of collimator lenses, each being arranged relative to each of the plurality of optical fibers to pass a laser beam therethrough; a condenser lens condensing the laser beams of the optical fibers; and a supply nozzle for supplying a material by injection, wherein the supply nozzle is arranged so as to penetrate the condenser lens at a center thereof, and the optical fibers are arranged on a periphery of the supply nozzle such that distances between the optical fibers and the collimator lenses or the condenser lens through the collimator lenses are different,
selecting a location of each of the plurality of optical fibers associated with each of the collimator lenses with respect to a radial direction of the condenser lens so that the laser beams are directed to plural different locations on an axis between a nozzle tip port and a welding spot on an axis of the condenser lens or a periphery of the axis, and
irradiating the material supplied from the supply nozzle with the laser beams from the optical fibers at the plural different locations on the axis between the nozzle tip port and the welding spot while melting the material by the laser beams,
wherein distances to the collimator lenses in the plurality of optical fibers are selected differently or the distances of the optical fibers to the supply nozzle located at the center of the optical fibers are different to melt the material at the plural different locations on the axis.

2. The laser machining method according to claim 1, further comprising a control member for moving each of the plurality of optical fibers associated with each of the collimator lenses, parallel to the supply nozzle or with respect to a radial direction of the condenser lens,
wherein the supply nozzle is arranged perpendicular to the condenser lens, and the optical fibers are arranged parallel to the supply nozzle.

3. The laser machining method according to claim 1, wherein a periphery of the welding spot is irradiated at a same time as the irradiation on the axis by applying the laser beams from the plurality of optical fibers, or a periphery of the welding spot is irradiated before the irradiation on the axis.

4. The laser machining method according to claim 1, wherein a distance of the material discharged from the tip port of the supply nozzle to the welding spot is changed by moving the condenser lens which the supply nozzle penetrates, or by moving the supply nozzle penetrating the condenser lens.

5. The laser machining method according to claim 1, wherein at least one of a wavelength, a condensing angle, a condensing diameter, an irradiation amount to the material or an irradiation amount to the welding spot of the laser beam is adjusted.

6. The laser machining method according to claim 1, wherein the supply nozzle comprises converging gas supply means, and the converging gas supply means injects converging gas from a side of the supply nozzle so that the material is converged.

7. The laser machining method according to claim 1, wherein the laser beams irradiated from the optical fibers are respectively directed to the plural different locations around a periphery of the axis where distances to the welding spot are different.

8. The laser machining method according to claim 1, wherein the radial locations of the plurality of optical fibers relative to a center of the condenser lens are different from each other.

9. The laser machining method according to claim 2, wherein the collimator lenses in the optical fibers are respectively arranged at different distances relative to the condenser lens.

* * * * *